(12) United States Patent
Nozaki

(10) Patent No.: US 8,791,994 B2
(45) Date of Patent: Jul. 29, 2014

(54) REPLAY DEVICE, REPLAY SYSTEM, AND TELEVISION SET

(75) Inventor: Hirotake Nozaki, Port Washington, NY (US)

(73) Assignee: Nikon Corporation, Tokyo (JP)

( * ) Notice: Subject to any disclaimer, the term of this patent is extended or adjusted under 35 U.S.C. 154(b) by 702 days.

(21) Appl. No.: 12/308,123

(22) PCT Filed: Jun. 29, 2007

(86) PCT No.: PCT/JP2007/063071
§ 371 (c)(1),
(2), (4) Date: Dec. 8, 2008

(87) PCT Pub. No.: WO2008/001877
PCT Pub. Date: Jan. 3, 2008

(65) Prior Publication Data
US 2009/0185033 A1    Jul. 23, 2009

(30) Foreign Application Priority Data
Jun. 29, 2006    (JP) ................................. 2006-179193

(51) Int. Cl.
*H04N 7/18*    (2006.01)
*G06K 9/78*    (2006.01)
(52) U.S. Cl.
USPC .......................................... 348/77; 382/118
(58) Field of Classification Search
CPC .......... G06K 9/00221; G06K 9/00228; G06K 9/00288; G06K 9/00259; H04N 7/18
USPC ........... 340/572.1, 573.1; 348/77, 231.2, 563, 348/14.16, 139; 382/116, 117, 118, 157, 382/209, 224, 305, 313; 707/E17.02, 999.2, 707/999.104, 999.107; 725/37, 135
See application file for complete search history.

(56) References Cited

U.S. PATENT DOCUMENTS

| | | | | |
|---|---|---|---|---|
| 6,038,333 | A * | 3/2000 | Wang | 382/118 |
| 7,242,988 | B1 * | 7/2007 | Hoffberg et al. | 700/28 |
| 2002/0103813 | A1* | 8/2002 | Frigon | 707/104.1 |
| 2005/0015803 | A1* | 1/2005 | Macrae et al. | 725/41 |
| 2006/0055825 | A1* | 3/2006 | Shiota et al. | 348/563 |
| 2006/0056737 | A1* | 3/2006 | Ohtsuka et al. | 382/305 |

FOREIGN PATENT DOCUMENTS

| | | |
|---|---|---|
| JP | A-2000-175117 | 6/2000 |
| JP | A-2002-333652 | 11/2002 |
| JP | A-2005-210369 | 8/2005 |
| JP | A-2006-079458 | 3/2006 |
| JP | A-2006-081021 | 3/2006 |
| JP | A-2006-135895 | 5/2006 |

OTHER PUBLICATIONS

May 29, 2012 Office Action issued in Japanese Patent Application No. 2008-522642 (with translation).

\* cited by examiner

*Primary Examiner* — Peling Shaw
(74) *Attorney, Agent, or Firm* — Oliff PLC

(57) ABSTRACT

A replay device includes: a user recognition unit that performs user recognition processing; and a replay source selection unit that chooses a replay source, from among a plurality of replay sources, according to a user recognized by the user recognition unit.

22 Claims, 13 Drawing Sheets

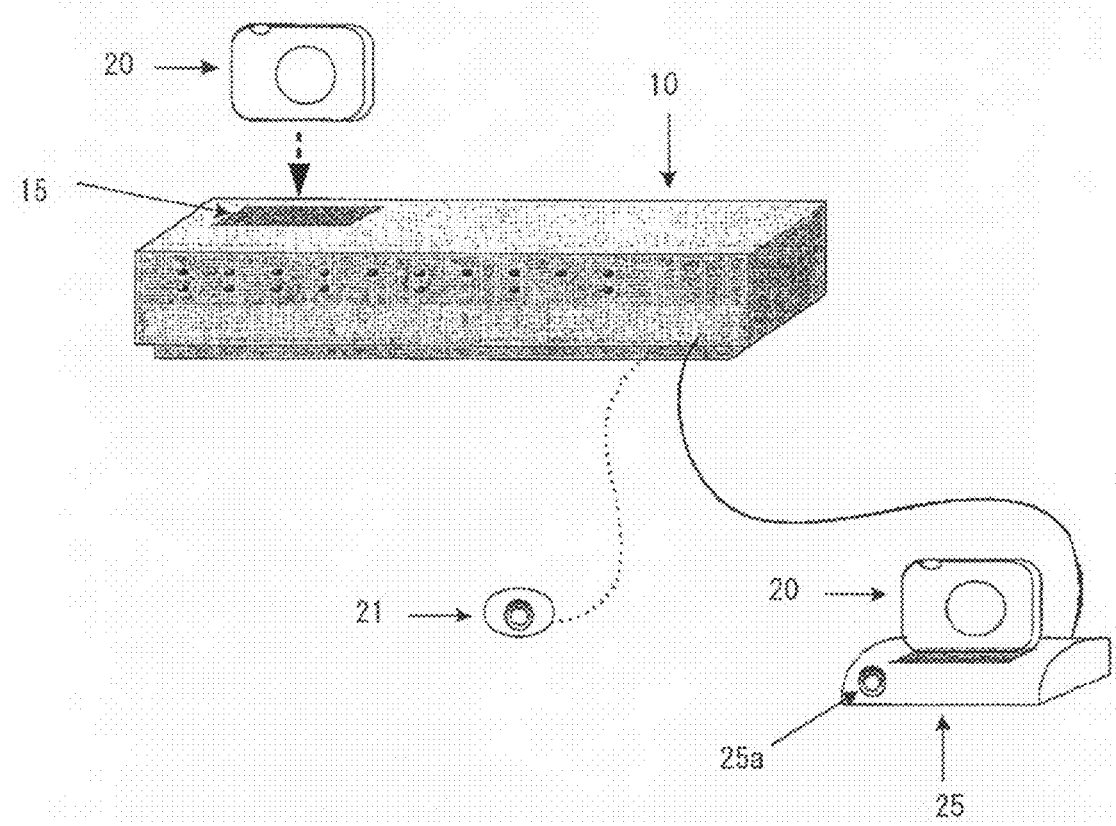

REPLAY DEVICE, REPLAY SYSTEM, AND TELEVISION SET

TECHNICAL FIELD

The present invention relates to a replay device, to a replay system, and to a television set.

BACKGROUND ART

A television receiver is known that recognizes the user, and that tunes a program in a genre preferred by the user according to the result of recognition of the user and according to program information that is inputted in advance (for example, refer to Patent Document #1).
Patent Document #1: Japanese Laid-Open Patent Publication 2000-175117.

DISCLOSURE OF THE INVENTION

Problems to be Solved by the Invention

In the case of this prior art technique, it is necessary to input program data into the television receiver in advance.

Means for Solving the Problems

According to the 1st aspect of the present invention, a replay device comprises: a user recognition unit that performs user recognition processing; and a replay source selection unit that chooses a replay source, from among a plurality of replay sources, according to a user recognized by the user recognition unit.

According to the 2nd aspect of the present invention, in the replay device according to the 1st aspect, it is preferred that the replay source selection unit chooses, from among a plurality of replay sources, a replay source in which the user who has been recognized by the user recognition unit appears.

According to the 3rd aspect of the present invention, in the replay device according to the 1st or the 2nd aspect, it is preferred that the replay source selection unit chooses, not only image information in which the user who has been recognized appears as a photographic subject, but also music information that is set in a corresponding image.

According to the 4th aspect of the present invention, in the replay device according to any one of the 1st through 3rd aspects, it is preferred that the replay source selection unit chooses a replay source in which a user other than a user who has been commanded among users who have been recognized, appears.

According to the 5th aspect of the present invention, in the replay device according to any one of the 1st through 4th aspects, it is preferred that the replay device further comprises a replay source presentation unit that presents information about replay sources that have been chosen, in an order of the user who has been recognized appearing more often.

According to the 6th aspect of the present invention, in the replay device according to the 5th aspect, it is preferred that, if no replay source exists that should be selected by the replay source selection unit, the replay source presentation unit presents the plurality of replay sources in an order of newness.

According to the 7th aspect of the present invention, in the replay device according to the 5th or the 6th aspect, it is preferred that the replay device further comprises a signal supply unit that supplies, to a replay unit, a replay signal from a replay source commanded for replay based upon information presented by the replay source presentation unit.

According to the 8th aspect of the present invention, in the replay device according to any one of the 1st through 7th aspects, it is preferred that the user recognition unit performs the recognition processing using a photographic image in which a person who is observing an image being replayed by the replay device has been photographed.

According to the 9th aspect of the present invention, in the replay device according to the 8th aspect, it is preferred that the photographic image is transmitted to the replay device from an external photographic device.

According to the 10th aspect of the present invention, a replay system comprises: a replay device according to the 8th or the 9th aspect; and a camera that photographs a person who is observing an image being replayed by the replay device, and transmits the photographed image to the replay device.

According to the 11th aspect of the present invention, a replay system comprises: a replay device according to the 8th or the 9th aspect; a camera that photographs a person who is observing an image being replayed by the replay device, and transmits the photographed image to the replay device; and a television set comprising a demodulation unit that receives a television broadcast and obtains a signal to be replayed, that replays a replay signal supplied from the replay device and a replay signal supplied from the demodulation unit.

According to the 12th aspect of the present invention, a replay system comprises: a replay device according to any one of the 1st through 9th aspects; and a replay unit that replays a replay signal from the replay source.

According to the 13th aspect of the present invention, a television set comprises: a replay system according to the 11th aspect; and a demodulation unit that receives a television broadcast and obtains a replay signal.

Advantageous Effect of the Invention

According to the present invention, it is possible to choose a replay source according to the user who is recognized, even without inputting information about the replay source in advance.

BRIEF DESCRIPTION OF THE DRAWINGS

FIG. 11 is a figure for explanation of a variant embodiment of the replay device and electronic camera;

BEST MODE FOR CARRYING OUT THE INVENTION

In the following, preferred embodiments for implementation of the present invention will be explained with reference to the drawings.

The First Embodiment

Figure 1:
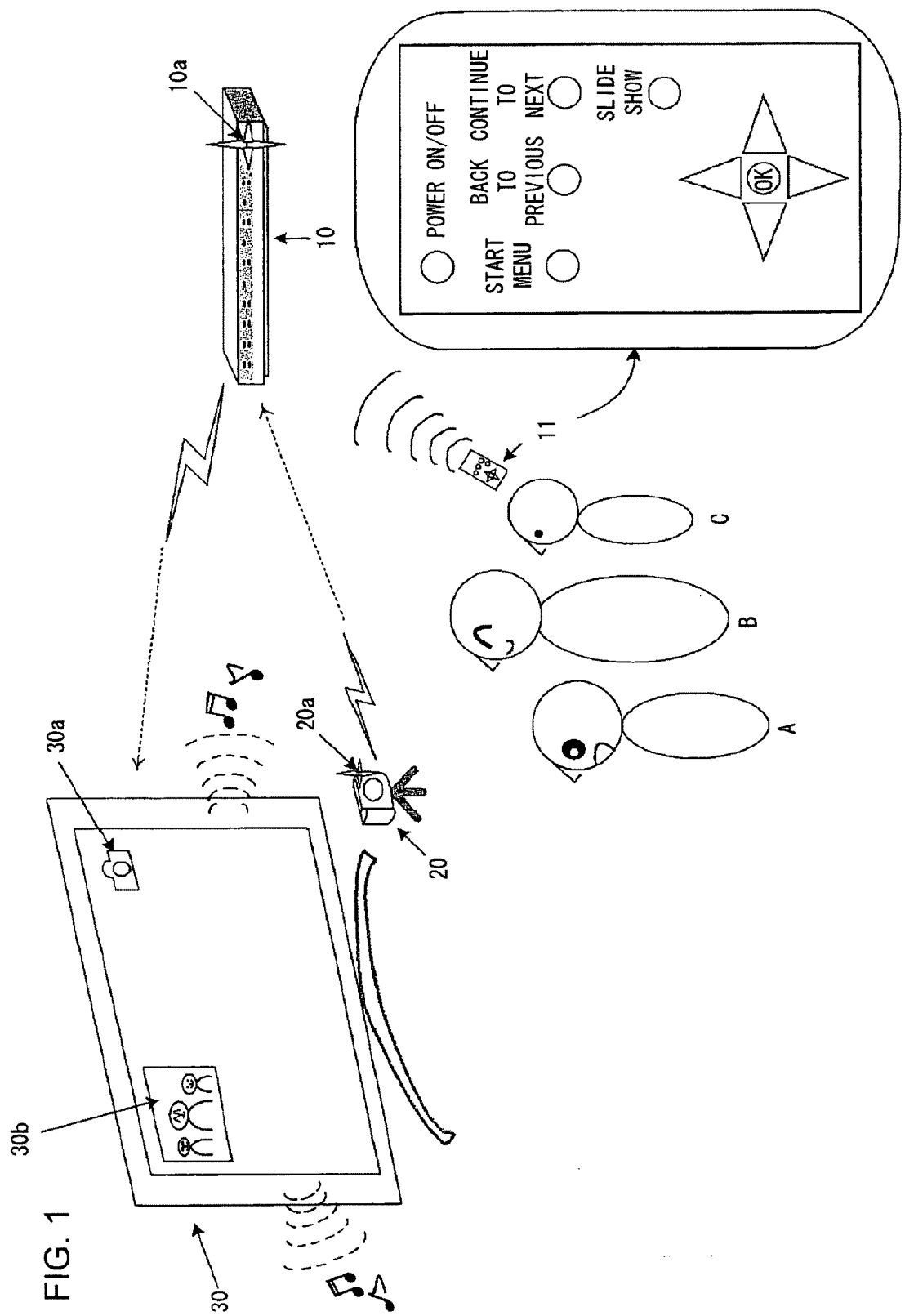
FIG. 1 is a figure showing an example of an information replay system according to a first embodiment of the present invention.

FIG. 1 is a figure showing an example of an information replay (reproducing) system that includes a replay device 10 according to a first embodiment of the present invention. This information replay system includes a combination of the replay device 10, an electronic camera 20, and a display monitor 30. In the example of FIG. 1 three people, i.e. a person A, a person B, and a person C, are appreciating displayed images and replayed music with this information replay system.

The display monitor 30 includes an image display unit such as a liquid crystal display panel, a plasma display panel, a CRT or other projection type display device, or the like, and a sound replay section, and performs replay of images from an image signal supplied by the replay device 10 and replay of music from a sound signal supplied by the replay device 10. The electronic camera 20 may, for example, be mounted in the neighborhood of the display monitor 30, and photographs the persons A through C who are observing the display monitor 30 and transmits the photographed image to the replay device 10.

The connection between the replay device 10 and the display monitor 30, and also the connection between the replay device 10 and the electronic camera 20, may be performed by wireless connection as shown in FIG. 1, or may also be performed by cable connection using cables.

Figure 2:
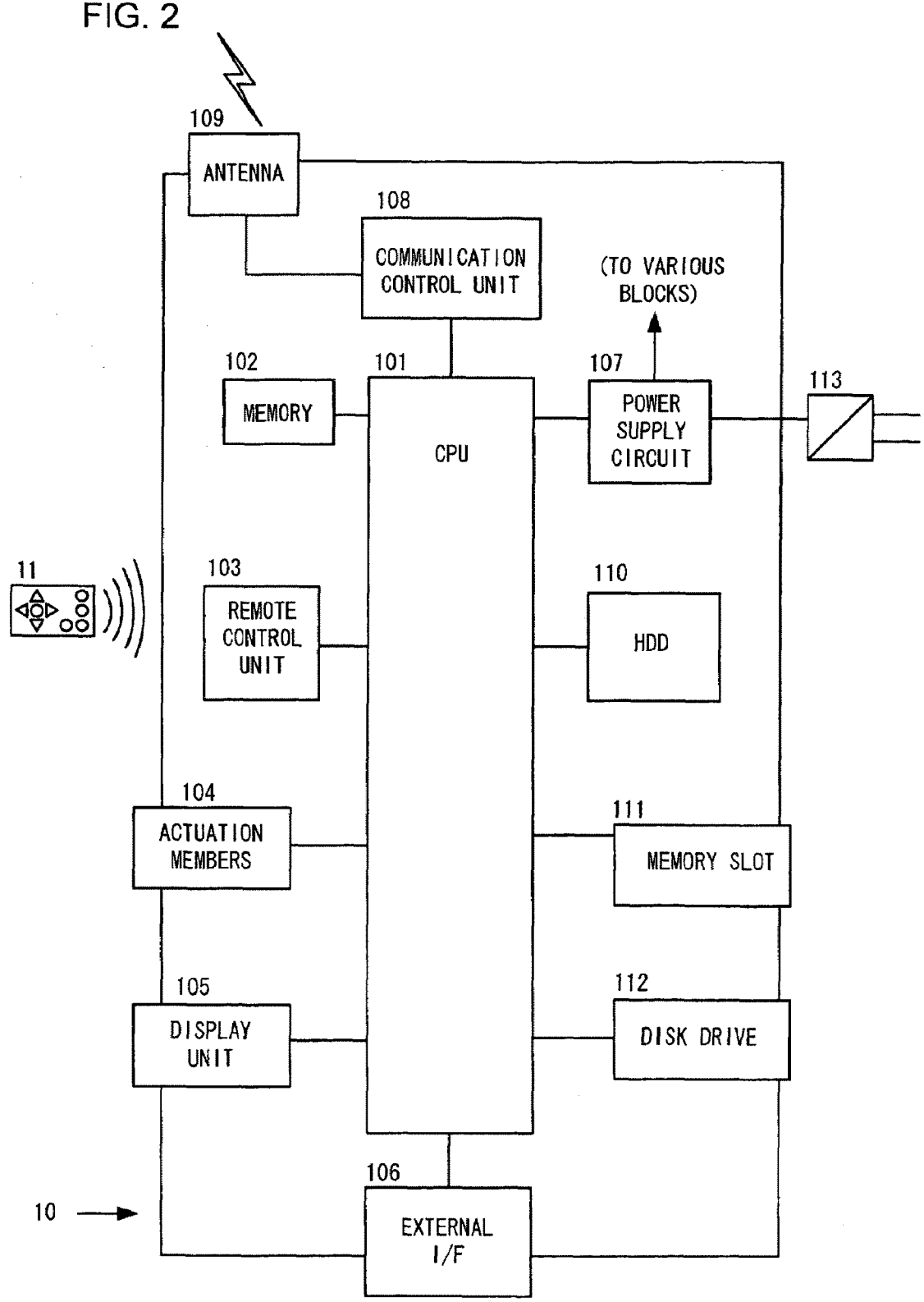
FIG. 2 is a block diagram for explanation of an example of the structure of a replay device.

FIG. 2 is a block diagram for explanation of an example of the structure of the replay device 10. This replay device 10 includes a CPU 101, a memory 102, a remote control unit 103, actuation members 104, a display unit 105, an external interface (I/F) 106, a power supply circuit 107, a communication control unit 108, an antenna 109, a HDD (Hard Disk Drive) 110, a memory slot 111, and a disk drive 112.

Based upon a control program, the CPU 101, that is a controller, performs predetermined calculations and the like using signals inputted from various sections that make up the replay device 10, and controls various sections of the replay device 10. It should be understood that this control program is stored in a non-volatile memory within the CPU 101, not shown in the figures.

The memory 102 is used as a working memory for the CPU 101. The remote control unit 103 receives signals transmitted from a remote control transmitter 11, and outputs actuation signals to the CPU 101 according to these received signals. The actuation members include actuation switches and the like upon an actuation panel of the replay device 10, and send actuation signals to the CPU 101 corresponding to the switches that are actuated. The replay device 10 is adapted to be capable of being actuated by either the remote control transmitter 11 or the actuation members 104.

The display unit 105 is constituted by a LED or a liquid crystal display unit or the like, and performs display to show the operational state of the replay device 10 or the like according to command from the CPU 101. And, upon command from the CPU 101, the external interface 106 transmits and receives data to and from an external device (a computer or video player or TV tuner or the like) via a cable.

The power supply circuit 107 converts a supply of commercial power that is supplied via a power supply cable 113 into the DC power supply required within the replay device 10, and supplies the power supply after conversion to the various sections of the replay device 10. Upon command by the CPU 101, the HDD 110 can write, store, and read out data such as image data, audio data, and the like. A memory card (not shown in the figures) is fitted in the memory slot 111. This memory card includes a non-volatile memory, and, upon command by the CPU 101, can write, store, and read out data such as image data, audio data, and the like.

For example, a DVD (Digital Video Disk) not shown in the figures may be fitted into the disk drive 112. Upon command by the CPU 101, data such as image data or audio data or the like may be written into, stored upon, and read out from this DVD.

The communication control unit 108 includes a wireless transmission and reception circuit, and performs communication with the electronic camera 20 and with the display monitor 30 according to commands from the CPU 101. The contents of communication with the electronic camera 20 are control information for the electronic camera 20 and image data photographed by the electronic camera 20 and the like. And the contents of communication with the display monitor 30 are control information for the display monitor 30 and image signals and sound signals replayed by the display monitor 30. The antenna 109 is a transmission and reception antenna for the communication control unit 108.

Main Processing

The flow of the main processing performed by the CPU 101 of the replay device 10 will now be explained with reference to the flow chart of FIG. 3. The program that performs the processing of FIG. 3 starts when a main switch (not shown in the figures) of the replay device 10 is actuated to be turned ON, and supply of power from the power supply circuit 107 to the CPU 101 is started.

Figure 3:
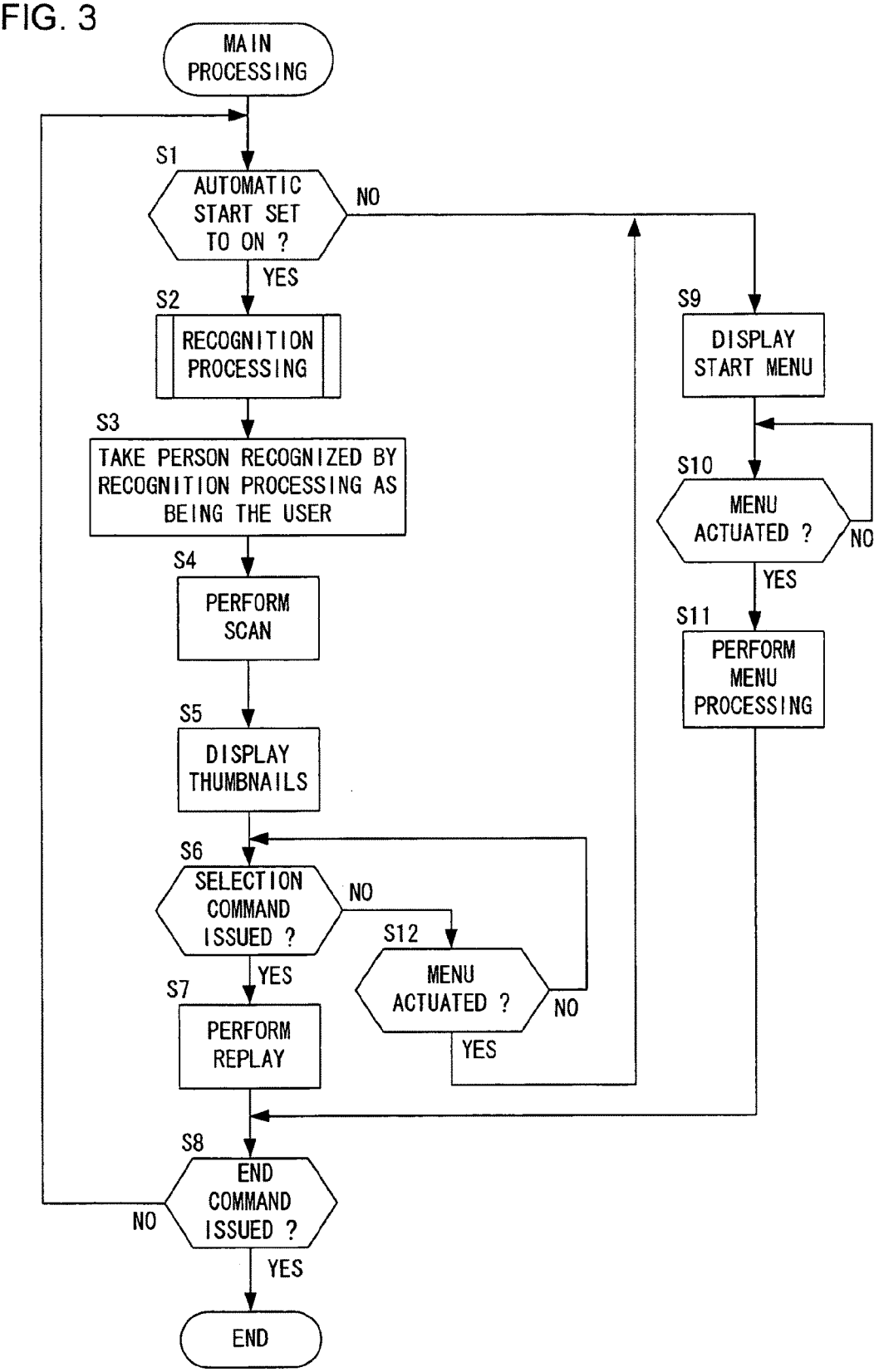
FIG. 3 is a flow chart for explanation of main processing performed by a CPU of the replay device.

In a step S1 of FIG. 3, the CPU 101 makes a decision as to whether automatic starting is set or not. Automatic starting is an operational mode in which recognition processing and proceeding to replay operation by the display monitor 30 is permitted without going via start menu actuation. Recognition processing is processing for photographing a user who is viewing information being replayed by the display monitor 30 with the electronic camera 20, and for recognizing a predetermined person from within the resulting photographic image. The details of this recognition processing will be described hereinafter. If an automatic start flag is ON then the CPU 101 reaches an affirmative decision in this step S1 and the flow of control proceeds to a step S2, whereas if the automatic start flag is OFF then it reaches a negative decision in this step S1 and the flow of control is transferred to a step S9. This automatic start flag is set in advance upon a "User recognition" menu that will be described hereinafter.

Figure 4:
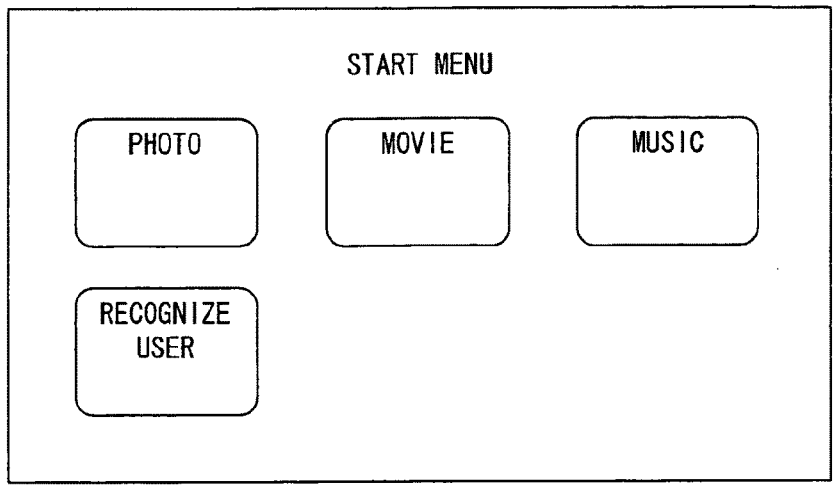
FIG. 4 is a figure showing an example of a start menu screen that is displayed upon a display monitor.

If the flow of control proceeds to the step S9, then the CPU 101 performs normal processing. In normal processing, the system proceeds to replay operation via start menu actuation. In this step S9, the CPU 101 generates the necessary image signal for display of a start menu screen and transmits this signal that it has generated from the communication control unit 108 to the display monitor 30, and then the flow of control proceeds to a step S10. FIG. 4 is a figure showing an example of this start menu screen that is displayed upon the display monitor 30. A "Photo" icon, a "Movie" icon, a "Music" icon, and a "Recognize user" icon are included upon this start menu screen.

In the step S10 of FIG. 3, the CPU 101 makes a decision as to whether or not the menu has been actuated. If an actuation signal is inputted from the remote control unit 103 or an actuation member 104 then the CPU 101 reaches an affirmative decision in this step S10 and the flow of control proceeds to a step S11, whereas if no actuation signal is inputted then this decision processing is repeated.

Menu Processing

In the step S11 the CPU 101 performs menu processing, and then the flow of control is transferred to a step S8. An example of this menu processing will now be explained. In FIG. 4, each of the "Photo" icon, the "Movie" icon, and the "Music" icon designates contents for replay by the display monitor 30. From among the icons that are being displayed upon the display monitor 30, the user (in the case of this example, one of the person A through the person C) selects the icon that corresponds to the contents that he desires to appreciate (for example, if he desires to appreciate a photograph, the "Photo" icon). The user inputs actuation signals to the CPU 101 by actuating the remote control transmitter 11 or the actuation members 104.

When an actuation signal for cursor shifting is inputted from the remote control unit 103 or an actuation member 104, the CPU 101 generates an image signal so as to shift a cursor (not shown in the figure) onto an icon that corresponds to the actuation signal, and transmits this signal that it has generated to the display monitor 30 from the communication control unit 108. Further, when an actuation signal that indicates that an "OK" button has been actuated is inputted from the remote control unit 103 or the actuation member 104, the CPU 101 selects that icon upon the screen of the display monitor 30 at which the cursor is positioned at that time point (for example the "Photo" icon).

Appreciation of a Photograph

Figure 5:
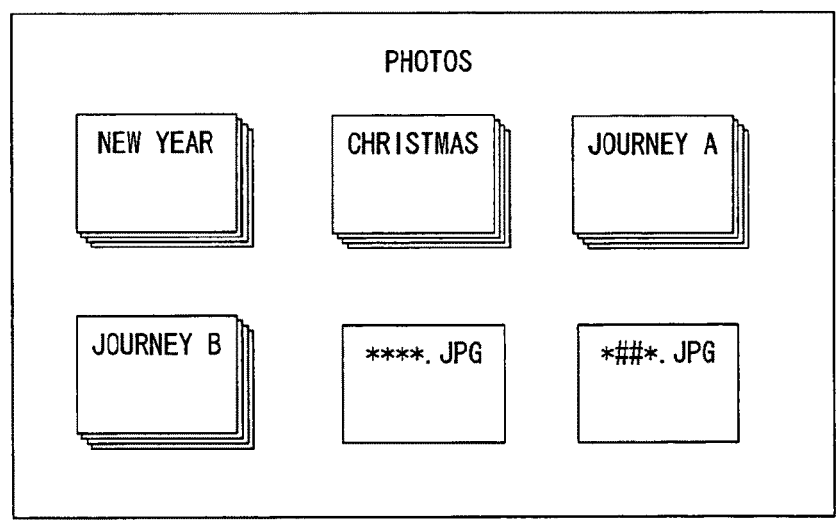
FIG. 5 is a figure showing an example of a "Photo" menu screen that is displayed upon the display monitor.

When the "Photo" icon has been selected, the CPU 101 generates the image signal required to display the "Photo" menu screen, and transmits this signal that it has generated to the display monitor 30 from the communication control unit 108. FIG. 5 is a figure showing an example of the "Photo" menu screen being displayed upon the display monitor 30. On this "Photo" menu screen there are included a "New Year" album icon, a "Christmas" album icon, a "Journey A" album icon, a "Journey B" album icon, and the names of image files that are not registered in any album. Representative images (thumbnails) of the images in the albums are included in the display of their icons, and thumbnail images are displayed along with the displays of the names of the image files that are not registered in any album.

When displaying album icons and image file names during normal processing, the CPU 101 displays them arranged in order from the one whose date and time of creation are the newest. For the image files that are included in each album and the image files that are not registered in any album, normally those found stored within the HDD 110 are displayed, but it is also possible, according to an actuation signal, to find files from a memory card in the memory slot 111 or from a DVD in the disk drive 112.

Once the "Photo" menu screen has been displayed upon the display monitor 30, when an actuation signal to shift the cursor is inputted from the remote control unit 103 or an actuation member 104, the CPU 101 generates an image signal to shift the cursor (not shown in the figure) over the icons or file names according to this actuation signal, and transmits this signal that it has generated to the display monitor 30 from the communication control unit 108. Moreover, when an actuation signal that indicates actuation of the "OK" button is inputted from the remote control unit 103 or an actuation member 104, then the CPU 101 reads out from the HDD 110 (or from a memory card or a DVD) the image file that corresponds to the album icon (or to the image file) at which the cursor is positioned at this time point upon the screen of the display monitor 30.

And the CPU 101 generates an image signal for replay display upon the display monitor 30 of the contents that it has read out, and transmits this signal that it has generated to the display monitor 30 from the communication control unit 108. Due to this, the album or the like is replayed upon the display monitor 30. It should be understood that, if a music file is linked in correspondence to an image file that is to be replayed, then the CPU 101 reads out that music file from the HDD 110 (or from a memory card or a DVD), and generates an audio signal for audio replay of the contents that it has read out upon the display monitor 30, and transmits this signal that it has generated to the display monitor 30 from the communication control unit 108. Due to this, the music that matches the image being replayed is also replayed by the display monitor 30.

Although the example of appreciating a photograph has been explained above, the procedure is similar in the case of appreciating a movie, in which the "Movie" icon is selected, or in the case of appreciating music, in which the "Music" icon is selected.

User Recognition

Figure 6:
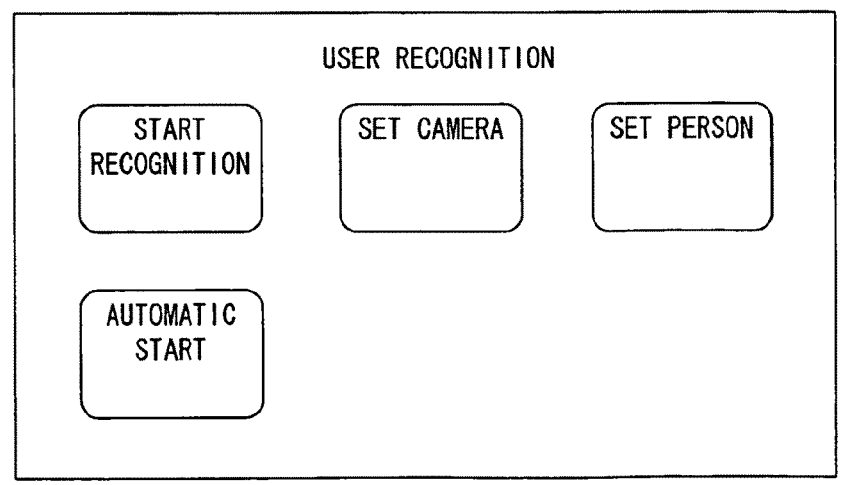
FIG. 6 is a figure showing an example of a "User recognition" menu screen that is displayed upon the display monitor.

If the "Recognize user" icon of FIG. 4 has been selected, the CPU 101 generates the required image signal for display upon the display monitor 30 of the "Recognize user" menu screen, and transmits this signal that it has generated to the display monitor 30 from the communication control unit 108. FIG. 6 is a figure showing an example of this "Recognize user" menu screen that is being displayed upon the display monitor 30. A "Start recognition" icon, a "Set camera" icon, a "Set person" icon, and an "Automatic start" icon are included in this "Recognize user" menu screen.

After the "Recognize user" menu screen has been displayed upon the display monitor 30, when an actuation signal to shift the cursor is inputted from the remote control unit 103 or an actuation member 104, the CPU 101 generates an image signal to shift the cursor (not shown in the figure) over the icons or file names according to this actuation signal, and transmits this signal that it has generated to the display monitor 30 from the communication control unit 108. Moreover, when an actuation signal that indicates actuation of the "OK" button is inputted from the remote control unit 103 or an actuation member 104, then the CPU 101 selects that icon upon the screen of the display monitor 30 at which the cursor is positioned at that time point.

If the "Start recognition" icon has been selected, then the CPU 101 starts the recognition processing. The details of this recognition processing will be described hereinafter. If the "Set camera" icon has been selected, then the CPU 101 performs the necessary settings upon the camera for recognition processing. In this embodiment, the CPU 101 transmits from the communication control unit 108 a control signal to make the electronic camera 20 start in the photography mode, and a control signal to make the photographic zoom lens of the electronic camera 20 shift to the wide angle side.

If the "Automatic start" icon has been selected, then the CPU 101 performs changeover of the above described automatic start flag. Thus, when selection actuation of the "Automatic start" icon is performed in the state in which the automatic start setting is ON (i.e. the flag is ON), the CPU 101 turns the automatic start setting flag to OFF, while when selection actuation of the "Automatic start" icon is performed in the state in which the automatic start setting is OFF (i.e. the flag is OFF), it turns the automatic start setting flag to ON.

Figure 7:
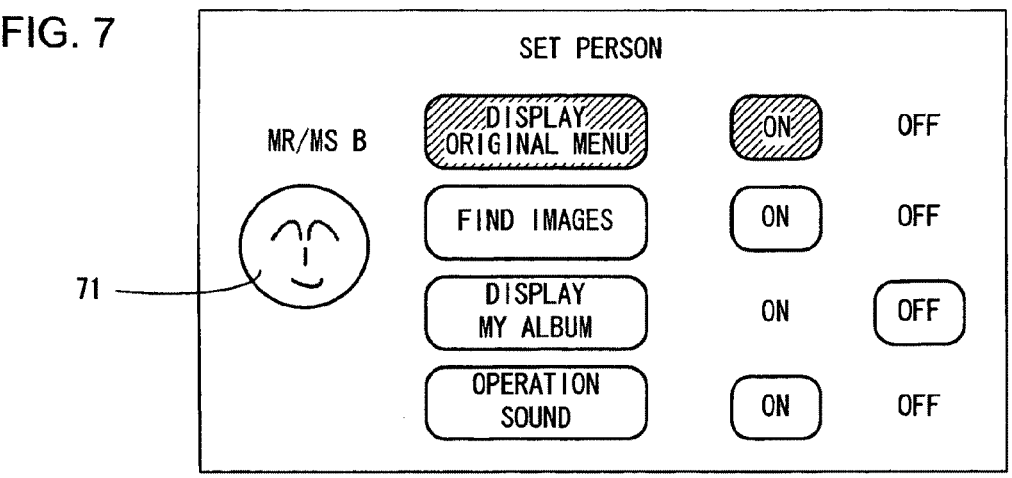
FIG. 7 is a figure showing an example of a "Set person" menu screen that is displayed upon the display monitor.

If the "Set person" icon has been selected, then the CPU 101 starts the recognition processing described above, and, after the recognition processing has ended, generates the required image signal for display upon the display monitor 30 of the "Set person" menu screen, and transmits this signal that it has generated to the display monitor 30 from the communication control unit 108. FIG. 7 is a figure showing an example of this "Set person" menu screen that is being displayed upon the display monitor 30, and is a menu screen upon which settings for a "Person B" are being performed. An image 71 of a human face, a "Display original menu" icon, a "Find image" icon, a "Display My Album" icon, and an "Operation sound" icon are included in this "Set person" menu screen. The "Set person" menu screen is made so as to be able to change over its display for each person who is recognized by the recognition processing and is registered.

After the "Set person" menu screen has been displayed upon the display monitor 30, when an actuation signal to shift the cursor is inputted from the remote control unit 103 or an actuation member 104, the CPU 101 generates an image signal to shift the cursor (not shown in the figure) over the icons or file names according to this actuation signal, and transmits this signal that it has generated to the display monitor 30 from the communication control unit 108. Here, "Display original menu" (a custom menu could also be displayed) is a function that permits display of a menu for each user who is registered in advance by the person who has been registered (for example, the person B), instead of the normal start menu (FIG. 4).

When the "Display original menu" icon is selected, the CPU 101 performs changeover of the "Display original menu" function between ON and OFF. When this display original menu function is selected and actuated to "ON", then display of an original menu is permitted. Such an original menu may be, for example, one in which some predetermined icon or icons on the normal start menu are not displayed, or one to which an icon not included in the normal start menu is added.

However, when the display original menu function is selected and actuated to "OFF", then the CPU does not permit display of the original menu. If the display original menu function is "OFF", then the CPU 101 displays the normal start menu (FIG. 4).

"Find image" is a function that commands whether or not to search for albums and image files that include the person who has been recognized (for example the person B) as a photographic subject. When the "Find image" icon is selected, the CPU 101 performs changeover of the "Find image" function between ON and OFF. When the find image function is selected and actuated to "ON", then the CPU 101 permits searching for albums and image files that include the facial image of that person (in this example, the person B); whereas, when the find image function is selected and actuated to "OFF", then the CPU 101 excludes the facial image of that person (the person B) from the subjects for searching.

And "Display My Album" is a function that permits an album that is registered in advance by the person who has been recognized (for example the person B) to be displayed, in addition to the normal "Photo" menu (FIG. 5). When the "Display My Album" icon is selected, the CPU 101 performs changeover of the "Display My Album" function between ON and OFF. When the display My Album function is selected and actuated to "ON", then the CPU 101 permits display of My Album. In this case a "My Album" is included upon the "Photo" menu.

And, when the Display My Album function is selected and actuated to "OFF", then the CPU 101 does not permit display of My Album. Thus, when the Display My Album function is "OFF", the normal "Photo" menu (FIG. 5) is displayed.

Finally, "Operation sound" is a function that commands the presence or absence of an operation sound when the replay device 10 has received an actuation signal. When the "Operation sound" icon is selected, the CPU 101 performs changeover of the "Operation sound" function between ON and OFF. When the operation sound function is selected and actuated to "ON", then the CPU 101 permits the emission of operation sounds, so that, each time an actuation signal is received, a sound signal is generated for causing audio replay of an operation sound, and the signal that has been generated is transmitted from the communication control unit 108 to the display monitor 30.

But, when the operation sound function is selected and actuated to "OFF", then the CPU 101 prohibits the emission of any operation sound, so that no sound signal for causing audio replay of any operation sound is transmitted from the communication control unit 108.

If an affirmative decision has been reached in the above described step S1 of FIG. 3, then the flow of control proceeds to the step S2, and the CPU 101 performs automatic start processing. In the step S2 the CPU 101 performs recognition processing, and then the flow of control proceeds to a step S3. The details of the recognition processing will be described hereinafter.

In the step S3 the CPU takes the person who has been recognized by the recognition processing (for example the person B) as being the user, and then the flow of control proceeds to a step S4. The person recognition process is not limited to one person; it would also be possible to recognize a plurality of people. In the step S4, the CPU 101 performs a scan operation over a specified storage region for the face of the user who has been recognized. In concrete terms, the CPU 101 searches for albums and image files that contain the facial image of the user who has been recognized (in this example, the person B) among the albums and image files that are stored in a region that is specified in advance (a storage region that is specified within the HDD 110, the memory card, and the DVD).

For this scan operation, the technique disclosed in Japanese Laid-Open Patent Publication 2002-333652 is employed. This technique disclosed in the publication described above is one in which the faces of people are detected from the photographic images, and, among these faces that have been detected, those faces that accord with a facial appearance registered in advance are detected. In the scan operation of the step 4, the faces of people are detected from the various albums and the various image files, and, among these faces that have been detected, those faces that accord with facial appearance information registered in advance for the faces of users (in this example, the facial appearance information for the person B) are detected. The CPU 101 stores in the memory information that specifies the titles of the various albums and the various image files in which the face of the user (in this example, the face of the person B) is included as a photographic subject, and their storage locations, and then the flow of control proceeds to a step S5.

In this scan operation, it would also be acceptable to arrange to store, as facial information files for reference, just the facial images of persons who have been detected from the various albums and the various image files upon the HDD 110, in correspondence with those albums and those image files (this could be done for the memory card and/or the DVD as well). In this case, since it is possible to detect the faces of persons from the facial information files for reference instead of detecting the faces of persons from the various albums and the various image files, accordingly it is possible to increase the speed of scanning the next time and subsequently, as compared to the case of detecting the faces of persons from the various albums and the various image files. It should be understood that it would also be acceptable to arrange to generate facial information files for reference at the time points that the various albums and the various image files are accumulated upon the HDD 110 (this could be done for the memory card and/or the DVD as well).

Figure 8:
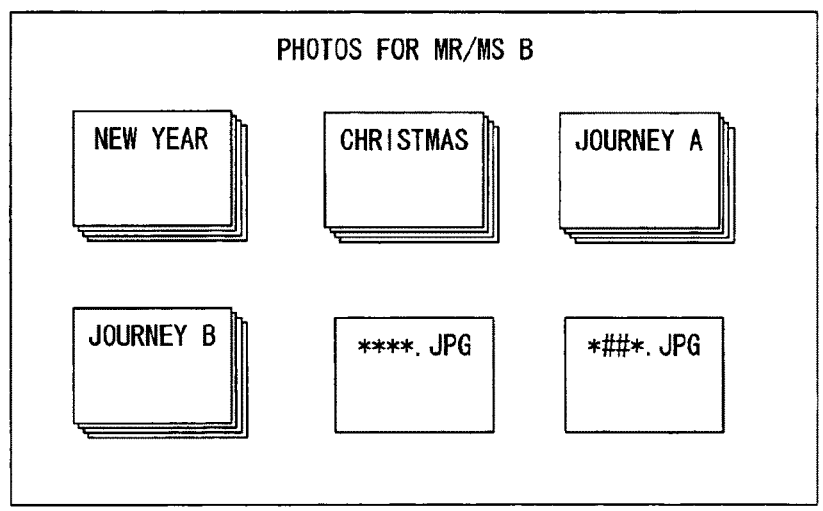
FIG. 8 is a figure showing an example of the "Photo" menu screen for a person B.

In the step S5, the CPU 101 displays those albums and image files in which the face of the user is included upon the display monitor 30 as thumbnails, and then the flow of control proceeds to a step S6. In concrete terms, the CPU 101 creates the necessary image signal for display of a "Photo" menu screen relating to the person who has been recognized, and transmits this signal that it has generated to the display monitor 30 from the communication control unit 108. FIG. 8 is a figure showing an example of a "Photo" menu screen for the person B that is displayed upon the display monitor 30. When displaying the album icons and image file names in order, the CPU 101 displays them arranged in order of how much the face of the person B is included (appears) in them.

In the example of FIG. 8, there are included a "Journey A" album icon, a "Journey B" album icon, a "Christmas" album icon, a "New Year" album icon, and image file names that are not registered in any album. The feature that representative images (thumbnails) in the albums are included in the displays of the album icons, and the feature that the image file names that are not registered in any album are displayed along with thumbnail images, are the same as in the case of FIG. 5.

If some person other than the person B is recognized (the person A or the person C), then the thumbnail displays in the step S5 are shown in order from that person whose face is included the greatest number of times. When an actuation signal that commands page changeover is inputted from the remote control unit 103 or an actuation member 104, then the CPU 101 performs thumbnail display for that person (for example, the person A) whose face is included most often. In this manner, each time an actuation signal that specifies page changeover is inputted, thumbnail display is performed for the albums and image files and so on that relate to each person who is recognized.

It should be understood that, if no albums or image files exist in which the face of the person who has been user recognized is included, or if none of the faces that have been extracted during the recognition processing are yet registered, then, in a similar manner to the display that is performed during the normal processing described above (the step S11), the album icons and image file names are displayed in order from those whose date and time of creation are the most recent. In this case, it would also be acceptable to arrange to include in the thumbnail display images that the owner of this replay device 10 has registered in advance (for example images that are stored in his Favorites folder).

In the step S6 of FIG. 3, the CPU 101 decides whether or not a selection command has been issued. If an actuation signal that indicates actuation of the "OK" button is inputted from the remote control unit 103 or the actuation member 104, then the CPU 101 reaches an affirmative decision in this step S6 and the flow of control proceeds to a step S7, whereas if no actuation signal that indicates actuation of the "OK" button is inputted then the CPU 101 reaches a negative decision in this step S6 and the flow of control is transferred to a step S12. According to an actuation signal from the remote control unit 103 or the actuation member 104, the CPU 101 generates an image signal so as to shift the cursor (not shown in the figures) upon an icon or file name. The signal that has thus been generated is transmitted from the communication control unit 108 to the display monitor 30.

In the step S7 the CPU 101 starts the replay operation, and then the flow of control proceeds to a step S8. In concrete terms, the image file that corresponds to the album icon (or the image file) over that the cursor is positioned upon the screen of the display monitor 30 is read out from the HDD 110 (or from the memory card or DVD), an image signal is generated for replay displaying the contents that have been read out upon the display monitor 30, and the signal that has thus been generated is transmitted from the communication control unit 108 to the display monitor 30. By doing this, replay of an album or the like upon the display monitor 30 is performed.

It should be understood that, if a music file is linked in correspondence to an image file that is to be replayed, then the CPU 101 reads out that music file from the HDD 110 (or from the memory card or the DVD), and generates an audio signal for audio replay of the contents that has thus been read out upon the display monitor 30, and transmits this signal that it has generated to the display monitor 30 from the communication control unit 108. The replay after the selection command is the same as the details explained with respect to appreciation of a photograph in the step S11.

In the step S8, the CPU 101 decides whether or not an end command has been issued. If an actuation signal that commands ending is inputted from the remote control unit 103 or the actuation member 104, then the CPU 101 reaches an affirmative decision in this step S8 and performs predetermined power supply OFF processing, and then the main processing of FIG. 3 terminates. But if no actuation signal that commands ending is inputted, then the CPU 101 reaches a negative decision in this step S8, and the flow of control returns to the step S1.

Since the recognition processing (of the step S2) is performed for a second time if the flow of control returns to the step S1, accordingly, if a user who is different from when the recognition processing was performed the previous time is observing the display monitor 30, then this new user is recognized, and a "Photo" menu screen for this person who has been recognized is displayed upon the display monitor 30 (the step S5).

In the step S12 that is proceeded to when a negative decision is reached in the step S6, the CPU 101 makes a decision as to whether or not menu actuation is being performed. If an actuation signal is inputted from the remote control unit 103 or the actuation member 104, then the CPU 101 reaches an affirmative decision in this step S12 and the flow of control returns to the step S9, whereas if no actuation signal is inputted then the flow of control returns to the step S6.

The Recognition Processing

The details of the recognition processing will now be explained with reference to the flow chart of FIG. 9. In a step S21 of FIG. 9 the CPU 101 issues a command to the camera to perform photography, and then the flow of control proceeds to a step S22. In concrete terms, a control signal that commands photography and a control signal that commands transmission of the photographic image to the replay device 10 are transmitted from the communication control unit 108 to the electronic camera 20. Due to this, photography is performed and the photographic image is transmitted from the electronic camera 20 to the replay device 10. The electronic camera 20 is controlled so as, after having transmitted the photographic image, not to store this image data (i.e. so as to delete it).

Upon receipt of this control signal that commands photography, the electronic camera 20 turns on an operation lamp 20a (see FIG. 1), and notifies the persons A through C who are observing the display monitor 30 that the information replay system is photographing them and performing user recognition processing. It should be understood that it would also be acceptable to arrange for the replay device 10 itself to turn on the recognition processing lamp 10a and to notify the above described persons A through C that the electronic camera 20 is operating. Even further, it would also be acceptable to arrange for the replay device 10 to create an image signal for including a camera mark 30a (see FIG. 1) or a photographic image 30b (see FIG. 1) that has been transmitted from the electronic camera 20 in the contents being displayed upon the display monitor 30, and to notify the above described persons A through C that the electronic camera 20 is operating by transmitting the signal that has been generated from the communication control unit 108 to the display monitor 30 and displaying it upon the display monitor 30.

Figure 9:
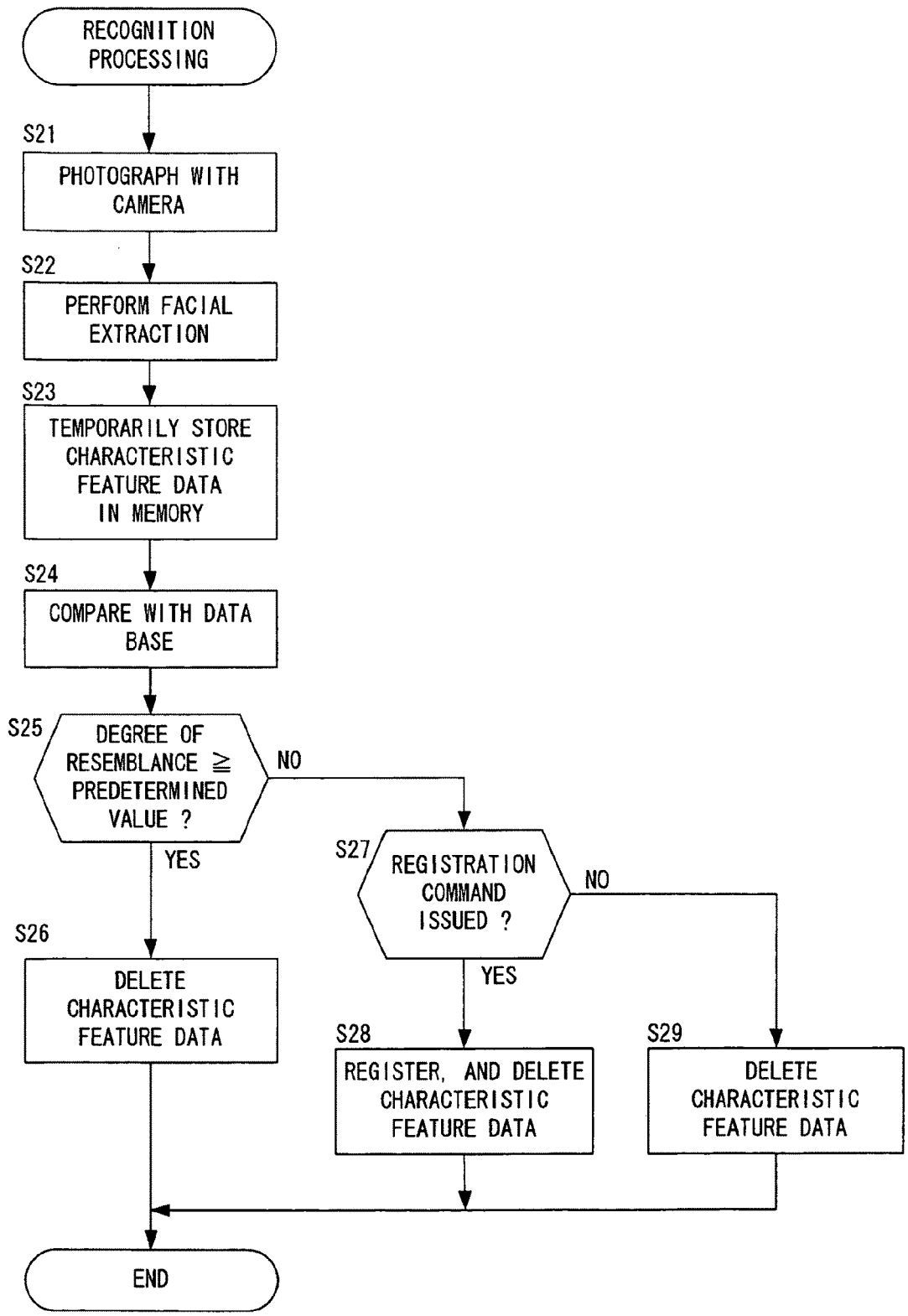
FIG. 9 is a flow chart for detailed explanation of recognition processing.

In the step S22 of FIG. 9, the CPU 101 performs face extraction upon the photographic image that has been received by the communication control unit 108, and then the flow of control proceeds to a step S23. The processing from the step S22 through the step S25 may, for example, utilize the technique disclosed in Japanese Laid-Open Patent Publication H09-251534 (U.S. Pat. No. 5,982,912). With the technique disclosed in the publications described above, the facial region of a person is extracted from the photographic image, characteristic feature data (the positions of the eyes or the nose or the like) are acquired from this facial region that has been extracted, and a person who is registered in advance is identified by using this characteristic feature data.

Figure 10:
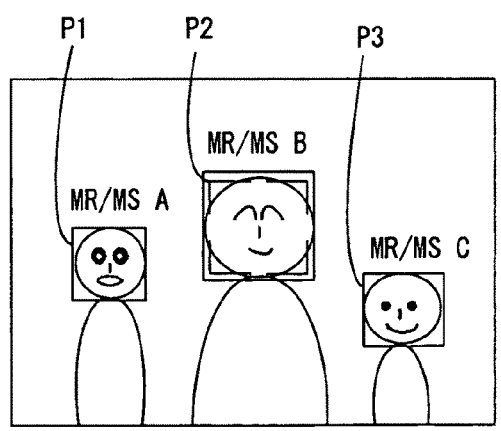
FIG. 10 is a figure showing an example of a photographic image, made by an electronic camera, that is displayed upon the display monitor.

The CPU 101 sends command and image signals to the communication control unit 108, and performs replay display upon the display monitor 30 of the image that has been photographed by the electronic camera 20. FIG. 10 is a figure showing an example of the screen that is displayed upon the display monitor 30 at this time point. In FIG. 10 three people are being displayed: person A, person B, and person C. If it is arranged to replay display an image consisting of the photographed image inverted left to right, then it will be easy for the three people observing the display screen, i.e. person A, person B, and person C, to grasp the correspondence relationship between the people who are being displayed and themselves.

In the step S23 of FIG. 9, the CPU 101 acquires the characteristic feature data from the facial region that has been extracted and temporarily stores this data that it has acquired in a memory, and then the flow of control proceeds to a step S24. In this step S24, the CPU 101 performs comparison with a data base. In concrete terms, the CPU 101 compares together a normalized image that is generated from the temporarily stored characteristic feature data, and reference images of registered persons registered in the data base in advance, and then the flow of control proceeds to a step S25.

In the step S25, the CPU 101 makes a decision as to whether or not the degree of resemblance that is calculated by the comparison described above is greater than or equal to a predetermined value. If, for all of the faces that have been extracted, some reference image is registered in the data base for which the degree of resemblance to the above described normalized image is greater than or equal to the predetermined value, then the CPU 101 reaches an affirmative decision in this step S25 and the flow of control proceeds to a step S26. This is the case in which all of the person A, the person B, and the person C have been authenticated. Having authenticated these persons whose faces have been extracted, the CPU 101 sends a command and an image signal to the communication control unit 108, and causes it to overlay display, upon the photographic image that is being displayed upon the display monitor 30, a frame (see FIG. 10) surrounding each face that has been extracted (in the case that the three persons A through C have been authenticated, the frames P1 through P3). And, in the step S26, the CPU 101 deletes from its memory the photographic image that was received from the electronic camera 20, the characteristic feature data that was temporarily stored, and the normalized image(s) that were generated from this data, and then the processing of FIG. 9 terminates.

On the other hand if, for at least a single one of the faces that have been extracted, there is no reference image registered in the data base for which the degree of resemblance to the above described normalized image is greater than or equal to the predetermined value, then the CPU 101 reaches a negative decision in the step S25, and the flow of control is transferred to a step S27. For example, if the person A and the person C are authenticated, but the person B is not authenticated, then the frames P1 and P3 in FIG. 10 are overlay displayed.

In the step S27, the CPU 101 decides whether or not registration command actuation has been performed. The CPU 101 sends a command and an image signal to the communication control unit 108 to overlay display the message "Register user?", for example, over the photographic image that is being displayed upon the display monitor 30. If an actuation signal that specifies a register command is being inputted from the remote control unit 103 or an actuation member 104, then the CPU 101 reaches an affirmative decision in this step S27 and the flow of control proceeds to a step S28, whereas if no such actuation signal that specifies a register command is inputted, then the CPU 101 reaches a negative decision in this step S27 and the flow of control is transferred to a step S29.

In the step S28 the CPU 101 registers the face that is currently being extracted and that is a non-registered facial image (for example the person B) as a reference image, and sends a command and an image signal to the communication control unit 108 to overlay display a doubled frame (P2) surrounding the face that has been registered over the photographic image that is being displayed upon the display monitor 30. Moreover, the CPU 101 deletes from its memory the photographic image that was received from the electronic camera 20, the characteristic feature data that was temporarily stored, and the normalized image(s) that were generated from this data, and then the processing of FIG. 9 terminates.

And, in the step S29, the CPU 101 deletes from its memory the photographic image that was received from the electronic camera 20, the characteristic feature data that was temporarily stored, and the normalized image(s) that were generated from this data, and then the processing of FIG. 9 terminates.

According to the first embodiment explained above, the following beneficial operational effects are obtained.

Relating to Convenience of Use (1) This information replay system recognizes the user who is viewing, and chooses a replay source automatically from among the replay sources that are present within the system, corresponding to the user whom it has recognized. Due to this, if for example a user is sitting in the viewing position, images in which that user appears as the photographic subject, and music that corresponds to those images, are selected automatically. The user need not enter information as to the replay source that he desires to replay into the information replay system in advance, so that it is possible to provide an information replay system whose convenience of use is good.

(2) Since, with this information replay system, thumbnail images are presented upon the display monitor 30 of the replay sources, chosen in the order in which the face of the user who has been recognized is included most often (in the step S5), accordingly it is possible for the user to know which replay source he appears in himself most often, even without checking the contents of the replay sources himself.

(3) Since, with this information replay system, that replay source from among the replay sources displayed as thumbnails is replayed that is designated by a selection command, accordingly it is possible for the user to view that replay source that he desires to view in a simple manner.

(4) Since, with this information replay system, when during normal processing without performing user recognition processing the album icons and image file names are presented upon the display monitor 30 (in the step S11), they are presented in order from those whose date and time of creation are the most recent, accordingly it is possible for the user to know which is the most recent replay source, even without himself checking the contents of the replay sources.

Relating to Privacy Protection (5) Since, with this information replay system, it is arranged to inform the person A through the person C who are observing the display monitor that processing to recognize the user(s) is being performed, by lighting up the operation lamp 20a (see FIG. 1) upon the electronic camera 20, by lighting up the operation lamp 10a upon the replay device 10, and by overlay displaying the camera mark 30a or superimposing (picture-in-picture) the photographic image 30b over the contents being displayed upon the display monitor 30, accordingly the performance of recognition processing without the user(s) knowing that this is taking place is prevented.

(6) With this replay device 10, except for when some facial image, among the facial images that have been extracted and are not registered, for which registration has been commanded, is registered as a reference image (in the step S28), the characteristic feature data that was temporarily stored in the step S23, the normalized images that were generated from that data, and also the photographic image received from the electronic camera 20, are deleted from the memory (in the steps S26, S29, S28, and subsequently). Moreover, since after transmission of the photographed image to the replay device 10 the electronic camera 20 is controlled so that this image data is not stored (i.e. is deleted), accordingly none of the images that are photographed during the recognition processing remain within the system, so that it is possible to provide an information replay system in which privacy is accorded to the users.

Variant Embodiment #1

It would also be acceptable to arrange for a message like "Camera operating" to be displayed upon the display monitor 30, instead of the camera mark 30a.

Variant Embodiment #2

An example has been explained of the case in which, in the automatic start processing after an affirmative decision in the step S1 described above, upon the "Set person" menu for the "Person B", the searching for images was selected to "ON". In other words, thumbnail images of replay sources in which the face of the "Person B" who has been recognized appears more often are displayed upon the display monitor 30 (in the step S5). By contrast if, upon the "Set person" menu for the "Person B", the searching for images is selected to "OFF", then the facial image of which person B is excluded from the subjects for searching. In this case, in the step S5, it is possible automatically to select those images in which some other recognized user other than the person B (for example a person A) appears as a photographic subject, and any music that corresponds to these images, and it is possible to display upon the display monitor 30 the thumbnail images of the replay sources in which the face of the "Person A" is displayed more often. As a result, if the "Person B" has invited the "Person A" as a guest, it is possible for him to choose, as a priority, those replay sources in which his guest appears more often.

Variant Embodiment #3

As an example, a case has been described in which, if a plurality of persons are recognized, the thumbnail displays of the step S5 are displayed in the order from the person whose face is included most often in the replay sources. Instead of this, it would also be acceptable to arrange to provide a display based upon a priority order for the persons that is registered in advance. For example, if the priority order for the person A through the person C is registered as being the person C, the person A, and the person B, then, irrespective of the number appearing in the replay sources, the thumbnail displays are provided in the order of the person C, the person A, and the person B. When an actuation signal that commands page changeover is inputted from the remote control unit 103 or an actuation member 104, then the CPU 101 performs thumbnail display for the persons in this priority order. In this manner it is possible to provide, in a simple manner, the thumbnail displays of the albums and the image files that are related to a person who has been prioritized.

Variant Embodiment #4

It would also be acceptable to arrange, if a plurality of persons have been recognized, to display a list of these persons who have been recognized upon the display monitor 30, to set a priority order from among this list according to actuation signals from the remote control unit 103 or the actuation members 104, and to select a person or persons to be excluded from the subjects for searching.

Variant Embodiment #5

Although, in the above explanation, it was arranged to proceed to the decision processing (in the step S27) as to whether a register command has been issued or not, if there exists at least a single face that has been extracted and that is not registered (in other words, if some reference image for which the degree of resemblance is greater than or equal to the predetermined value is not registered in the database), it would also be acceptable to arrange, having previously displayed, for example, the message "Perform for recognized user" upon the display monitor 30, to proceed to the step S27 when an actuation signal indicating "OK" has been inputted from the remote control unit 103 or from an actuation member 104. If such an actuation signal indicating "OK" has not been inputted, then the characteristic feature data that has been temporarily stored, the normalized image that has been generated from this data, and also the photographic image received from the electronic camera 20 are deleted from the memory, and the above described automatic start flag is turned OFF and the processing of FIG. 9 terminates. Due to this, if a viewer is present whom it is not desirable to register, then it is possible to prevent subsequent recognition processing.

Variant Embodiment #6

Furthermore, it would also be acceptable to provide a structure with which, if a negative decision is taken in the step S25, recognition processing is stopped if all of the faces that have been extracted are not registered. In this case, if none of the three persons, i.e. the person A, the person B, and the person C is authenticated, then for example, after having displayed the message "Automatic start setting cancelled", for example, upon the display monitor 30, the characteristic feature data that has been temporarily stored, the normalized image that has been generated from this data, and also the photographic image received from the electronic camera 20 are deleted from the memory, and the above described automatic start flag is turned OFF and the processing of FIG. 9 terminates. Due to this, in the state in which none of the viewers are registered, this information replay system is made to perform normal processing, and it is possible to prevent the repetition of useless recognition processing.

Variant Embodiment #7

Furthermore, it would also be acceptable to provide a structure with which the system transits to normal processing, if a specified user is recognized. In this case if, among the persons who have been registered, this person who has been designated in advance is authenticated, then, after having displayed the message "Automatic start setting cancelled", for example, upon the display monitor 30, the characteristic feature data that has been temporarily stored, the normalized image that has been generated from this data, and also the photographic image received from the electronic camera 20 are deleted from the memory, and the above described automatic start flag is turned OFF and the processing of FIG. 9 terminates. Due to this, it is possible to cause the information replay system to perform normal processing, in the state in which the specified person is viewing. In this case, it would also be acceptable to arrange for the automatic start flag to be returned to ON, if this specified person ceases to be authenticated.

Variant Embodiment #8

It would also be acceptable to provide a structure in which a lens barrier of the photographic lens is closed during non-operation of the electronic camera 20. If the electronic camera does not include an operation lamp 20a, then, by this lens barrier being opened, it is possible for the person A through the person C who are observing the display monitor 30 to be informed that processing to recognize the users is being performed, while, by the lens barrier being closed, it is possible for them to be informed that such processing is not being performed.

Variant Embodiment #9

And while, with the information replay system shown by way of example in FIG. 1, the replay device 10 and the electronic camera 20 were connected together by wireless or by cable, it would also be acceptable to provide a structure with which, as shown in FIG. 11, the electronic camera 20 (that is an external device) is directly docked to a connection portion 15 of the replay device 10.

Variant Embodiment #10

It would also be acceptable to provide a structure in which the electronic camera 20 (that is an external device) is mounted upon a cradle 25, and the cradle 25 and the replay device 10 are connected together by cable or by wireless.

Variant Embodiment #11

It would also be acceptable to provide a structure with which a camera 25a is housed internally within a cradle 25, and recognition processing is performed via the cradle 25, without using the electronic camera 20. In this case, the replay device 10 commands the cradle 25, that is an external device, to perform photography with the camera. In concrete terms, a control signal to command photography by the camera 25a, and a control signal to command the image that has been photographed to be transmitted to the replay device 10, are transmitted from the external interface 106. By doing this, the photographic image is transmitted from the cradle 25, that has performed the photography, to the replay device 10. The feature that, after the cradle 25 has transmitted the photographic image, this image data is not stored, is the same as in the case in which recognition processing is performed by using an electronic camera 20.

Variant Embodiment #12

It would also be acceptable to arrange to connect a network camera 20 to the external interface 106 of the replay device 10, and to perform the recognition processing using an image that is obtained by the network camera 21, that functions as an external device. The connection might be by LAN connection instead of by USB connection.

Figure 14:
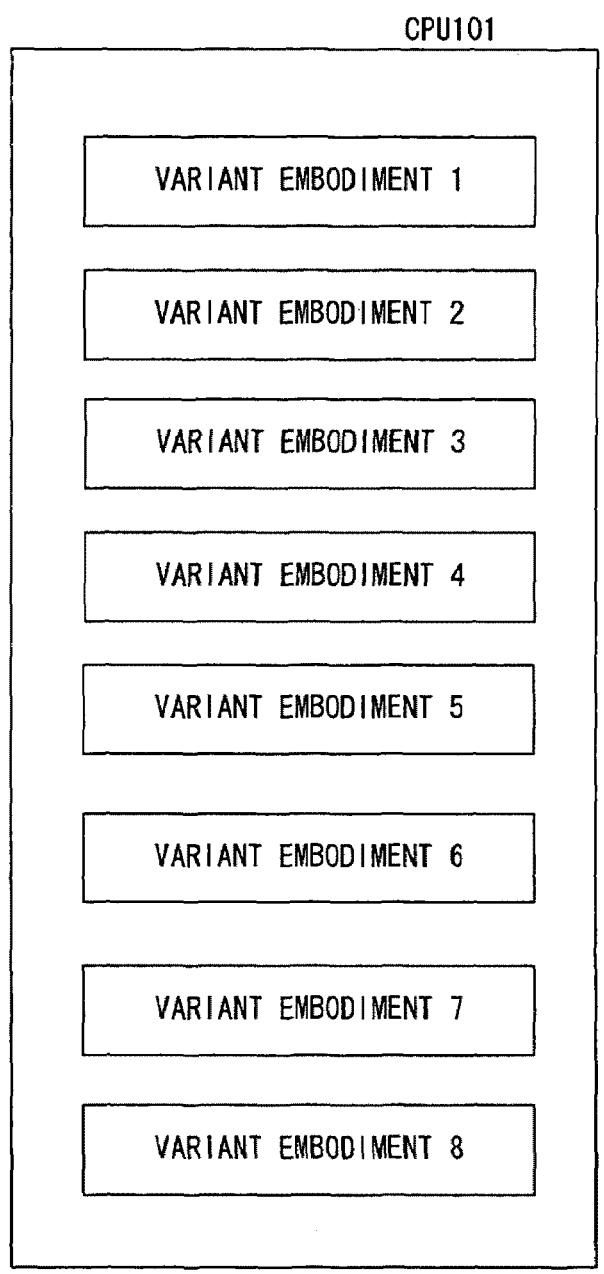
FIG. 14 is a functional block diagram showing variant embodiments #1 through #8 for processing by the CPU.

FIG. 14 is a functional block diagram showing the above described variant embodiments 1 through 8 that are processed by the CPU 101.

The Second Embodiment

Figure 12:
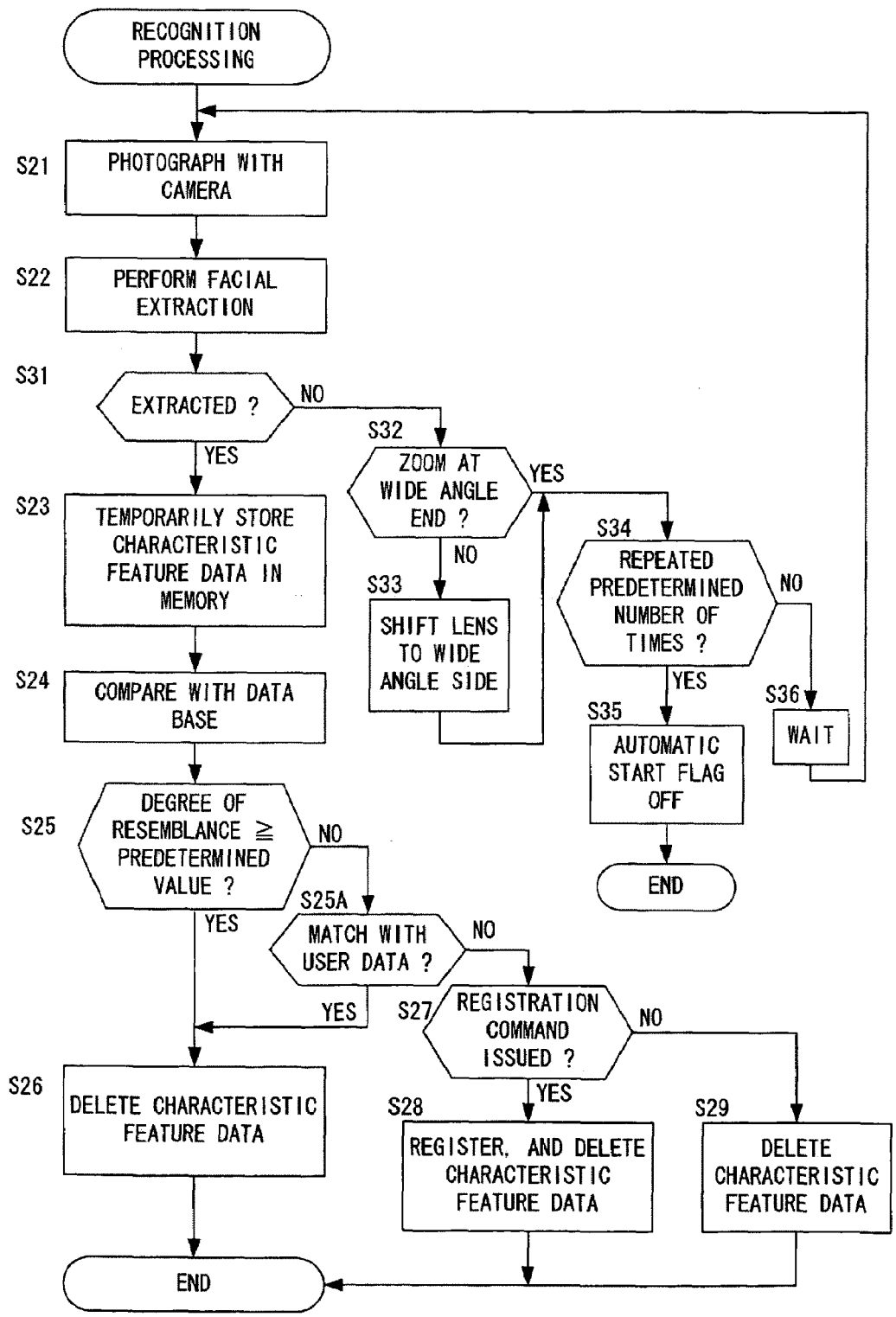
FIG. 12 is a flow chart for explanation of the flow of recognition processing according to a second embodiment of the present invention.

FIG. 12 is a flow chart for explanation of the flow of recognition processing according to a second embodiment of the present invention. The processing of FIG. 12 is executed by the CPU 101 instead of the processing of FIG. 9. The points of difference between FIG. 9 and FIG. 12 are that steps S31 through S36 are added between the steps S22 and S23, and that a step S25A is added after a negative decision in the step S25, and the explanation will center upon these points of difference.

In the step S31 that is reached after the step S22, the CPU 101 makes a decision whether or not a facial region has been extracted. If the face of a person has been extracted, then the CPU 101 reaches an affirmative decision in this step S31 and the flow of control proceeds to the step S23, whereas if no face of a person has been extracted then the CPU 101 reaches a negative decision in this step S31 and the flow of control proceeds to a step S32.

In the step S32, the CPU 101 makes a decision as to whether or not a photographic zoom lens of the electronic camera 20 is at its wide angle end. If the information for the electronic camera that is received by the communication control unit 108 shows that the zoom lens is at its wide angle end, then the CPU 101 reaches an affirmative decision in this step S32 and the flow of control is transferred to a step S34, whereas if it does not indicate that the lens is at its zoom wide angle end then the CPU 101 reaches a negative decision in this step S32 and the flow of control proceeds to a step S33.

In the step S33, the CPU 101 sends a command to the communication control unit 108 and causes it to transmit a control signal to shift the photographic zoom lens of the electronic camera 20 to its wide angle side, and then the flow of control proceeds to the step S34. In this step S34, the CPU 101 decides whether or not the step S21 (photography with the camera) and the step S22 (face extraction) have been repeated a predetermined number of times (for example, 60 times). If the number of times of repetition has attained the predetermined number of times, then the CPU 101 reaches an affirmative decision in the step S34 and the flow of control proceeds to a step S35, whereas if the number of times of repetition has not attained the predetermined number of times, then the CPU 101 reaches a negative decision in the step S34 and the flow of control is transferred to a step S36.

In the step S35, after having displayed a message such as, for example, "Automatic start setting cancelled" upon the display monitor 30, the CPU 101 turns the above described automatic start flag to OFF, and then the processing of FIG. 12 terminates. Due to this, the information replay system is caused to perform normal processing in the state in which face extraction is not possible. In the step S36, the CPU 101 inserts a wait (for example for one second), and then the flow of control returns to the step S21. Because of this, the face extraction is performed for a second time after an interval of one second.

In the step S25A that is reached after a negative decision in the step S25, the CPU 101 decides whether or not there is a match with user data. This user data is data that is included in the data base along with the reference images of the registered persons that are used in the step S24, and specifies the date that this registered person was authenticated in the past, the time slot, the persons who were authenticated at the same time, and so on. If some similar reference image is registered in the data base, although its degree of resemblance to the normalized image is not greater than or equal to the predetermined value, then the CPU 101 refers to the user data that is set in correspondence with that reference image. If the result of this reference is that at least one of the date, the time slot, or a person who was authenticated together matches the user data, then the CPU 101 reaches an affirmative decision in this step S25A, and the flow of control proceeds to the step S26.

On the other hand, if the result of the reference to the user data is that none of the date, the time slot, and an authenticated person matches the user data, then the CPU 101 reaches a negative decision in the step S25A, and the flow of control is transferred to the step S27.

According to the second embodiment as explained above, the following advantageous operational effects are obtained.

Effectiveness if the User Cannot be Specified (1) Since it is arranged, if no user can be recognized by the recognition processing, for the recognition processing to be repeated until the predetermined number of times is reached, accordingly the possibility is high that, even if by chance it happens that the face of the user is not facing in the direction of the electronic camera 20, it will still be possible to recognize the user by the recognition processing a second or subsequent time.

(2) If it is not possible to specify the user even though the step S21 (photography with the camera) and the step S22 (face extraction) are repeated the predetermined number of times, then the automatic start flag is turned to OFF (in the step S35). Due to this, it is possible to prevent the repetition of useless recognition processing in the state in which it is not possible to specify the user, and the information replay system is caused to perform normal processing.

(3) Since it is arranged, if the photographic zoom lens of the electronic camera 20 is not at its wide angle end, to shift the lens towards its wide angle side (in the step S33), and then to repeat the recognition processing for a second time, accordingly the possibility is high that, even if by chance it happens that the face of the user does not enter within the photographic angle of view, it will still be possible to recognize the user by the recognition processing a second or subsequent time.

(4) If some similar reference image is registered in the data base, while its degree of resemblance to the normalized image is not greater than or equal to the predetermined value, then it is arranged to authenticate the user by referring to the user data that is set in correspondence with that reference image. If the result of this reference to the user data is that at least one of the date, the time slot, or a person who was authenticated together matches, then it is considered that the person who is the subject of the normalized image is the registered person of that similar reference image, and authentication is performed. As a result, it is possible to enhance the possibility of recognition, even if the face of the user is looking away.

The Third Embodiment

Figure 13:
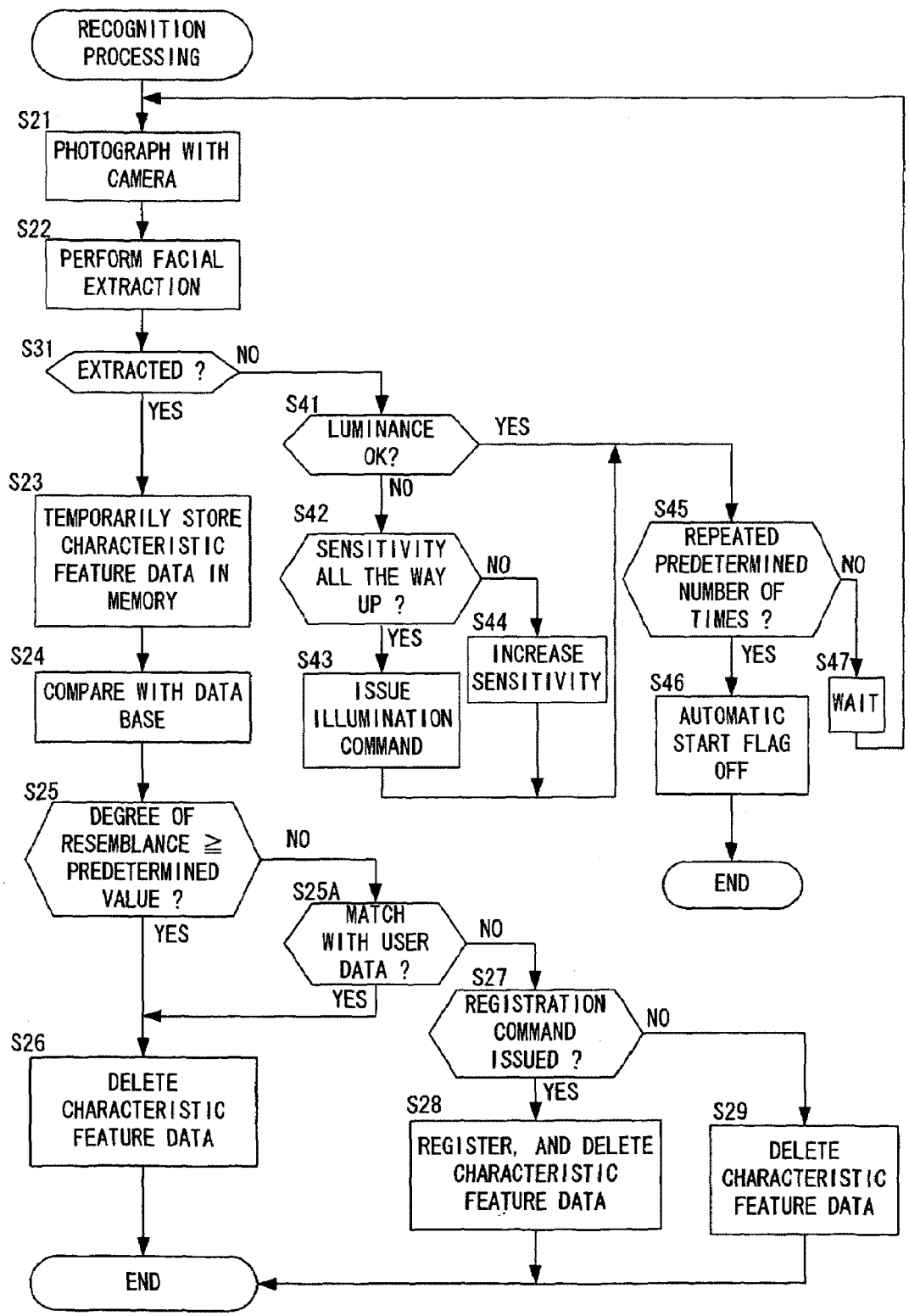
FIG. 13 is a flow chart for explanation of the flow of recognition processing according to a third embodiment of the present invention.

FIG. 13 is a flow chart for explanation of the flow of recognition processing according to a third embodiment of the present invention. The processing of FIG. 13 is executed by the CPU 101 instead of the processing of FIG. 12. The point of difference between FIG. 12 and FIG. 13 is that, in FIG. 13, steps S41 through S47 are added instead of the steps S32 through S36, steps S41 through S47 are added, and accordingly the explanation will center upon this point of difference.

In the step S41 to which control is transferred if a negative decision is reached in the step S31, the CPU 101 makes a decision as to whether or not the luminance is OK. If the brightness of the image data transmitted from the electronic camera 20 is greater than or equal to a predetermined value then the CPU 101 reaches an affirmative decision in this step S41 and the flow of control is transferred to a step S45, whereas if the brightness is less than that predetermined value then the CPU 101 reaches a negative decision in this step S41 and the flow of control proceeds to a step S42.

In this step S42, the CPU 101 makes a decision as to whether or not the image capture sensitivity of the electronic camera 20 is already all the way up. If the information for the electronic camera 20 that is received by the communication control unit 108 indicates that the sensitivity is all the way up, then the CPU 101 reaches an affirmative decision in this step S42 and the flow of control proceeds to a step S43, whereas if it does not show that the sensitivity is all the way up then the CPU 101 reaches a negative decision in this step S42 and the flow of control proceeds to a step S44.

In the step S43, the CPU 101 issues an illumination command. There are four types of illumination command, and, among these four types of illumination command, the CPU 101 executes that illumination command that is selected and ordered in advance; and then the flow of control is transferred to a step S45.

Illumination Command #1

During photography with the camera (in the step S21) the electronic camera is caused to emit illumination light. To execute the illumination command #1, the CPU 101 sends a command to the communication control unit 108 to cause it to transmit a control signal to the electronic camera 20 so as to emit illumination light from the illumination device of the electronic camera 20 during photography. The amount of illumination light may be a faint amount of emitted light at the minimum level necessary for facial detection.

Illumination Command #2

The amount of illumination light within the chamber (room) in which this information replay system is placed is increased. To execute the illumination command #2, the CPU 101 sends a command to the communication control unit 108 to cause it to transmit a control signal so as to increase the amount of light emitted by an illumination device in the chamber, not shown in the figures.

Illumination Command #3

During photography by the camera (in the step S21), a high luminance display (for example a white colored display) is performed upon the display monitor 30 for a predetermined number of frames (in this example, for one frame). To execute the illumination command #3, the CPU 101 generates the required image signal for a display of a white colored screen, and transmits this signal that it has generated to the display monitor 30 from the communication control unit 108. The white colored screen is inserted as one frame within the menu screen or the replay image or the like that is being displayed upon the display monitor 30. And the communication control unit 108 transmits respective control signals to the electronic camera 20 for commanding photography, and to the display monitor 30 for commanding the high luminance display, so as to synchronize these two actions.

Illumination Command #4

The electronic camera 20 is caused to perform photography (in the step S21) in a state in which a brightness greater than or equal to a predetermined level is being obtained. To execute the illumination command #4, the CPU 101 sends a command to the communication control unit 108 so as to cause it to transmit a control signal to the electronic camera 20 to perform photography at the timing at which the predetermined luminance is being obtained. Upon receipt of this control signal, the electronic camera 20, for example, may repeat image capture at 60 frames per one second, and performs photography (in the step S21) when it detects that the brightness data indicated by the image data is greater than or equal to a predetermined value, then transmitting this photographic image to the replay device 10. The CPU 101 performs face extraction using this photographic image that has been transmitted (in the step S22). If this illumination command #4 is executed, the information replay system interrupts recognition processing until it detects a brightness of greater than or equal to the predetermined value.

In the step S44, the CPU 101 sends a command to the communication control unit 108 to transmit a control signal to increase the image capture sensitivity of the electronic camera 20, and then the flow of control proceeds to the step S45. The processing of the steps S45 through S47 is the same as the processing of the steps S34 through S36 in FIG. 12, and accordingly explanation thereof will be omitted herein.

According to the third embodiment as explained above, the following advantageous operational effects are obtained.

Effectiveness if the User Cannot be Specified (1) Since, in the case of low luminance, if the photographic sensitivity of the electronic camera is not at its maximum, it is arranged to raise the sensitivity (in the step S44) and to repeat the recognition processing for a second time, accordingly the probability is high that the user will be recognized by the recognition processing this second time.

(2) Since, in the case of low luminance, if the photographic sensitivity of the electronic camera is at its maximum, it is arranged to issue the illumination command (in the step. S43) and to repeat the recognition processing for a second time, accordingly the probability is high that the user will be recognized by the recognition processing this second time.

(3) Since, by executing the illumination command #1, a weak amount of light that is the minimum for facial detection is caused to be emitted from the illumination device of the electronic camera 20 during photography by the camera (in the step S21), accordingly the user who is observing the display monitor 30 does not experience any dazzle.

(4) Since, by executing the illumination command #2, the amount of illumination light within the chamber is increased, accordingly the user who is observing the display monitor 30 does not experience any feeling of dazzle.

(5) Since, by executing the illumination command #3, the display monitor 30 is caused to display one frame of white color display during photography by the camera (in the step S21), accordingly it is possible for the electronic camera 20 to photograph the user who is illuminated by this white color screen. On the other hand, since the user who is observing the display monitor 30 does not notice the white color display, he accordingly does not experience any discomfort from the white color display.

(6) By executing the illumination command #4, the camera photography is performed (in the step S21) at the timing at which the interior of the chamber has become bright. The interior of the chamber becoming bright may be supposed to be when the illumination light within the chamber has been turned on, or when the display image upon the display monitor 30 has changed to bright. In either case, the user who is observing the display monitor 30 does not experience any feeling of discomfort.

(7) Since, in a similar manner to the case with the second embodiment, it is arranged to repeat the recognition processing until a predetermined number of times has been attained, accordingly the possibility is high that the user will be recognized by the recognition processing the second or subsequent time, even if by chance it happens that the face of the user is not facing in the direction of the electronic camera 20.

(8) Since, in a similar manner to the case with the second embodiment, the automatic start flag is turned to OFF if it has not been possible to specify the user even after repetition the specified number of times, accordingly it is possible to prevent useless repetition of the recognition processing.

(9) In a similar manner to the case with the second embodiment, it is possible to enhance the possibility of recognition, even if the face of the user is directed away.

Variant Embodiment #13

For the illumination command (the step S43), an example was explained in which an illumination command is issued that is selected in advance from among four illumination commands. Instead of this, it would also be acceptable to provide a structure in which the contents of the illumination command was changed over. For example, a priority order for illumination commands of illumination command #1, illumination command #2, illumination command #3, and illumination command #4 may be determined upon, and the contents of the illumination command may be changed over each time the processing of the step S43 is performed. Since, by doing this, if it has not been possible to perform face extraction during low luminance even though an illumination command is issued, then the recognition processing is repeated while changing the contents of the illumination command, accordingly it is possible to enhance the possibility of recognition of the user by the recognition processing the second time.

Variant Embodiment #14

While the number of times for repetition of the decision in the step S45 (the step S34) was taken to be 60 times, if the brightness at which the image data appears is not as great as the brightness that is needed for photography, then it would also be acceptable to arrange to reduce the number of times (for example from 60 times to 10 times). By doing this, it is possible to reduce the frequency at which the repetition processing is performed during low luminance conditions, so that it is possible to reduce the number of times that the recognition processing is performed uselessly.

Variant Embodiment #15

Apart from when the "Automatic start" icon is selected upon the "Recognize user" menu screen (FIG. 6), the changing over of the automatic start flag between ON and OFF by the replay device 14 could also be performed at the following timings.

Changing Over the Automatic Start Flag from OFF to ON

ON Timing #1

During the normal processing (the steps S9 through S1), the CPU 101 changes over the automatic start flag from OFF to ON at the timing at which the "Photo" menu screen (FIG. 5) is displayed. Since, by doing this, it is possible for the flow of control to proceed to the recognition processing (of the step S2) after the flow of control has returned to the step S1, accordingly it is possible to provide the thumbnail display of FIG. 8 on which, instead of the thumbnail display of FIG. 5, the replay source in which the user who has been recognized appears most often has been chosen as a priority.

ON Timing #2

During the normal processing (the steps S9 through S11), the CPU 101 changes over the automatic start flag from OFF to ON at the timing at which a slide show command is issued (i.e. when an actuation signal for causing a slide show to be replayed is inputted from the remote control unit 103 or the actuation unit 104). Since, by doing this, it is possible for the flow of control to proceed to the recognition processing (of the step S2) after the flow of control has returned to the step S1, accordingly, instead of the thumbnail display of FIG. 5, it is possible to choose as a priority that replay source in which the user who has been recognized appears most often, and to display a slide show.

ON Timing #3

During the normal processing (the steps S9 through S11), the CPU 101 changes over the automatic start flag from OFF to ON at the timing at which communication between the electronic camera 20 and the replay device 10 becomes effective. Since, by doing this, it is possible for the flow of control to proceed to the recognition processing (of the step S2) after the flow of control has returned to the step S1, accordingly it is possible to choose as a priority that replay source in which the user who has been recognized appears most often, and to display a thumbnail display or to display a slide show. It should be understood that the decision as to when the communication with the camera becomes effective may be made, not only with the system structure of FIG. 1 described above, but with the format of any of the variant embodiments #9, #10, #11, or #12. In this decision as to when communication becomes effective, this may be made when the electronic camera 20 has been brought within the range of communication, when the main switch of the electronic camera 20 is turned to ON, when the electronic camera 20 is connected to the connection portion 15 of the replay device 10, when the cradle 25 and the replay device 10 are connected together, or when the cradle 25 and the electronic camera 20 are connected together, and communication is performed using a predetermined protocol so that communication has become effective.

ON Timing #4

If the electronic camera 20 is provided with a lens barrier (the variant embodiment #8), then, during the normal processing (the steps S9 through S11), the CPU 101 changes over the automatic start flag from OFF to ON at the timing at which the opening of this lens barrier of the electronic camera 20 has been notified to the replay device 10. Since, by doing this, it is possible for the flow of control to proceed to the recognition processing (of the step S2) after the flow of control has returned to the step S1, accordingly it is possible to choose as a priority that replay source in which the user who has been recognized appears most often, and to display a thumbnail display or to display a slide show.

Changing Over the Automatic Start Flag from ON to OFF

OFF Timing #1

During the processing in which automatic starting is permitted (the steps S2 through S7), the CPU 101 changes over the automatic start flag from ON to OFF at the timing at which the replay processing of the step S7 (album replay or slide show replay) is started. Since, by doing this, the flow of control proceeds to the normal processing (of the steps S9 through S11) after the flow of control has returned to the step S1, accordingly the recognition processing (of the step S2) ceases to be performed until the automatic start flag is turned to ON for a second time, so that it is possible to suppress the consumption of electrical power by the electronic camera 20.

OFF Timing #2

During the processing in which automatic starting is permitted (the steps S2 through S7), the CPU 101 changes over the automatic start flag from ON to OFF at the timing at which the menu screen (for example, the screen of FIG. 8) is displayed. Since, by doing this, after that replay source in which the user who has been recognized appears most often has been chosen, the recognition processing (of the step S2) is not performed until the automatic start flag is turned to ON for a second time, accordingly it is possible to suppress the consumption of electrical power by the electronic camera 20.

OFF Timing #3

When performing the power supply OFF processing, the CPU 101 changes over the automatic start flag from ON to OFF at a timing before the power supply OFF processing. Since, by doing this, the recognition processing (of the step S2) is not performed during the power supply OFF processing, accordingly it is possible to suppress the consumption of electrical power by the electronic camera 20.

OFF Timing #4

When performing the sleep operation, the CPU 101 changes over the automatic start flag from ON to OFF at the timing that the sleep operation is commanded. Since, by doing this, the recognition processing (of the step S2) is not performed during the sleep processing, accordingly it is possible to suppress the consumption of electrical power by the electronic camera 20.

OFF Timing #5

During the processing in which automatic starting is permitted (the steps S2 through S7), the CPU 101 changes over the automatic start flag from ON to OFF at a timing at which an abnormal communication between the electronic camera 20 and the replay device 10 is detected. By doing this, the recognition processing (of the step S2) ceases to be performed in a situation in which there is a fear that the photographic image will not be transmitted, so that it is possible to prevent useless processing. The decision as to the occurrence of an abnormal communication is performed when the electronic camera 20 has been carried out of the communication range, when the main switch of the electronic camera 20 has been turned to OFF, when the electronic camera 20 has been detached from the connection portion of the replay device 10, when the connection between the cradle 25 and the replay device 10 has been severed, when the connection between the cradle 25 and the electronic camera 20 has been severed, or the like, and is made when communication has become ineffective.

OFF Timing #6

During the processing in which automatic starting is permitted (the steps S2 through S7), the CPU 101 changes over the automatic start flag from ON to OFF at a timing at which a notification has been issued to the replay device 10 that the lens barrier of the electronic camera 20 is closed. By doing this, the recognition processing (of the step S2) ceases to be performed, so that it is possible to avoid useless photographic processing.

OFF Timing #7

The CPU 101 changes over the automatic start flag from ON to OFF at the timing at which at least one face that has been extracted by the recognition processing (of the step S2) is not registered, and, even though the message "Perform user recognition?" is displayed upon the display monitor 30, no actuation signal that indicates "OK" has been inputted from the remote control unit 103 or the actuation member 104 (this corresponds to the variant embodiment #5). By doing this, it is possible to stop the recognition processing and to perform the normal processing, after the time point at which some viewer whom it is not desired to register comes to be present.

OFF Timing #8

If all of the faces that have been extracted by the recognition processing (of the step S2) are not registered, then the CPU 101 changes over the automatic start flag from ON to OFF at the timing of after having displayed the message "Automatic start setting cancelled" upon the display monitor 30 (this corresponds to the variant embodiment #6). By doing this, it is possible to stop the recognition processing and to perform the normal processing, after the time point at which the state comes to hold that all of the viewers are not registered.

OFF Timing #9

The CPU 101 changes over the automatic start flag from ON to OFF at the timing at which some specified user has come to be recognized by the recognition processing (of the step S2) (this corresponds to the variant embodiment #7). By doing this, it is possible to stop the recognition processing and to perform the normal processing, after the time point at which the state comes to hold that some specified user is recognized.

OFF Timing #10

If, in the recognition processing, the step S21 (photography with the camera) and the step S22 (face extraction) have been repeated a predetermined number of times but still it has not been possible to extract a face, then the CPU 101 changes over the automatic start flag from ON to OFF at the timing of after having displayed the message "Automatic start setting cancelled" upon the display monitor 30 (this corresponds to the second embodiment and the third embodiment). By doing this, it is possible to prevent useless repetition of the processing in the state in which it is not possible to specify a user.

Variant Embodiment #16

In the above described processing in which automatic starting is permitted (the steps S2 through S7), although the recognition processing (of the step S2) is performed automatically if the automatic start flag is ON, during the normal processing (of the steps S9 through S11) the recognition processing is not performed. Thus, in this variant embodiment #16, it is arranged forcibly to perform the recognition processing during the normal processing as well. In this case, the CPU 101 of the replay device 10 starts the recognition processing at the timing that the "Start recognition" icon (FIG. 6) is selected according to a menu actuation signal that is inputted during normal processing.

The Forcible Recognition Processing #1

When, in the state that the "Photo" menu screen (FIG. 5) is being displayed during normal processing, a selection command for the "Start recognition" icon is received, the CPU 101 starts recognition processing (FIG. 9, FIG. 12, or FIG. 13) in the background while keeping the "Photo" menu screen (FIG. 5) displayed just as it is. Due to this, after the recognition processing, it is possible to perform the thumbnail display of FIG. 8 instead of the thumbnail display of FIG. 5, having chosen as a priority the replay source in which the user who has been recognized has appeared the most often. It should be understood that these menu screens are displayed as arranged lined up, so as not to be mutually overlapped.

The Forcible Recognition Processing #2

When, in the state that a slide show is being displayed during normal processing, a selection command for the "Start recognition" icon is received, the CPU 101 starts recognition processing (FIG. 9, FIG. 12, or FIG. 13) in the background while continuing the display of the slide show just as it is. Due to this, it is possible not to interrupt the display of the slide show after the recognition processing, and it is possible to perform the display of the slide show, having changed over the images that are displayed in the slide show to those images in which the user has appeared the most often. It should be understood that the menu screen during the slide show is overlapped over a portion of the images that are being displayed in the slide show (picture-in-picture).

The Forcible Recognition Processing #3

When, in the state that an album is being displayed during normal processing, a selection command for the "Start recognition" icon is received, the CPU 101 starts recognition processing (FIG. 9, FIG. 12, or FIG. 13) in the background while continuing the display of the album just as it is. Due to this, after the recognition processing, it is possible to perform the thumbnail display of FIG. 8 instead of the album display, having chosen as a priority the replay source in which the user who has been recognized has appeared the most often, so that it is possible to await a command by the user for display. It should be understood that the menu screen during the album display is overlapped over a portion of the images in the album that is being displayed (picture-in-picture).

The Forcible Recognition Processing #4

When, in the state that the start menu screen (FIG. 4) is being displayed during normal processing, a selection command for the "Start recognition" icon is received, the CPU 101 starts recognition processing (FIG. 9, FIG. 12, or FIG. 13) in the background while continuing the display of the start menu screen (FIG. 4) just as it is. Due to this, after the recognition processing, instead of displaying the start menu of FIG. 4, it is possible to display the original menu of the user who has been recognized (if the display of the original menu is set to ON by that user). It should be understood that, when changing to the original display menu, the cursor position is adjusted to be over the same icon after the change as before. However, if the icon before the change does not exist after the change, then the cursor is positioned over the nearest icon.

Variant Embodiment #17

Figure 16:
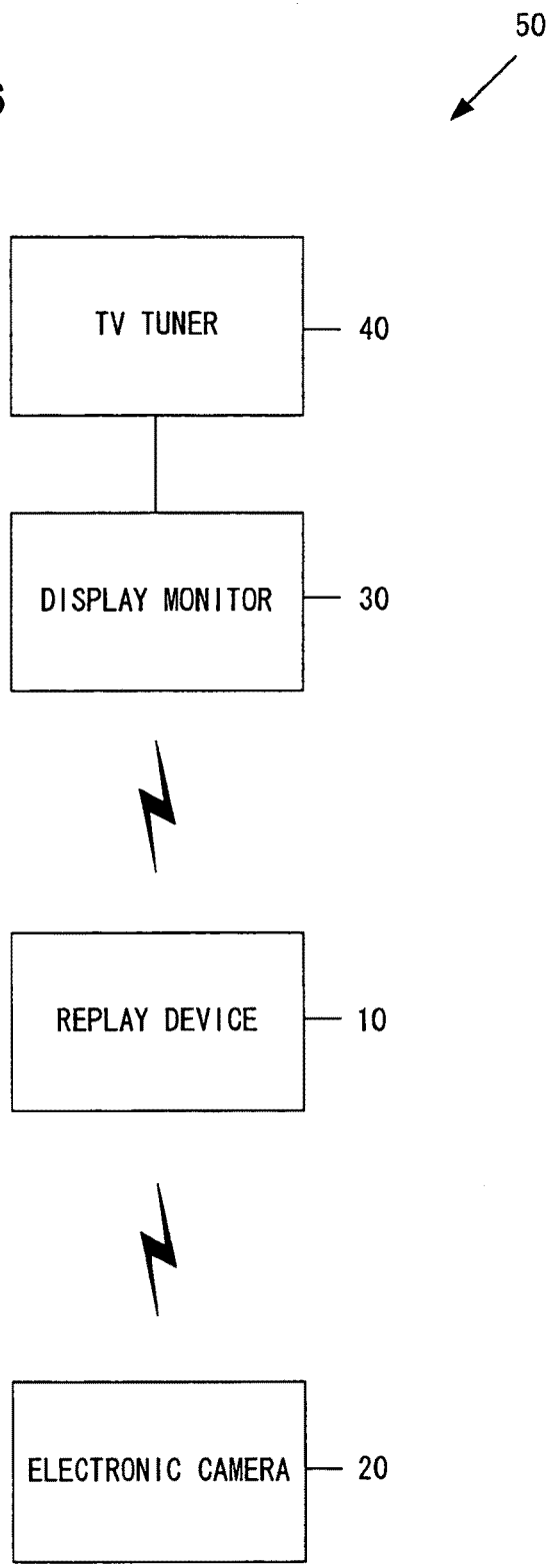
FIG. 16 is a block diagram showing a replay system that includes a television set, a replay device, and an electronic camera.

It would be acceptable to provide the display monitor 30 with a TV tuner 40 that receives television broadcasts, and to replay the video and audio demodulated thereby upon a television set 50. FIG. 16 is a block diagram showing a replay system that consists of this television set 50, replay device 10, and electronic camera 20. Moreover, it would also be acceptable to arrange for the television set 50 itself, including also the replay device 10, to constitute a replay system. Yet further, it would also be acceptable to arrange for this television set, that is the replay system, to include the electronic camera 20 as well.

Variant Embodiment #18

Although an example has been explained in which an information replay system was constituted as the combination of the replay device 10, the electronic camera 20, and the display monitor 30, it would also be acceptable to provide a structure in which the electronic camera 20 is housed within the replay device 10, or one in which the replay device 10 is housed within the electronic camera 20, or one in which the electronic camera 20 is housed within the display monitor 30, or one in which the electronic camera 20 is housed within a television set, or one in which the replay device 10 and a television set are integrated together, or one in which the replay device 10, the electronic camera 20, and the display monitor 30 are integrated together.

Variant Embodiment #19

While, in the processing for recognition of the users, a technique has been used in which faces obtained from a photographic image are recognized, it would also be acceptable to combine a facial recognition technique and a voice recognition technique. If voice recognition is used, then it would be acceptable to endow any one of the devices that makes up the information replay system with a function of capturing sound, and to employ processing for recognizing the user by the voice information which has thus been captured.

Variant Embodiment #20

In the processing for user recognition, as a recognition technique combined with the facial recognition technique, apart from a voice recognition technique, it would also be acceptable to employ a method in which each user utilizes his own remote control transmitter. In this case, each of the remote control transmitters would transmit a remote control actuation signal that includes information specifying its corresponding user. The remote control transmitters would include recognition switches that are changed over by each of the users in different combinations, or fingerprint recognition means for the user to be recognized by the remote control transmitters themselves.

Figure 15:
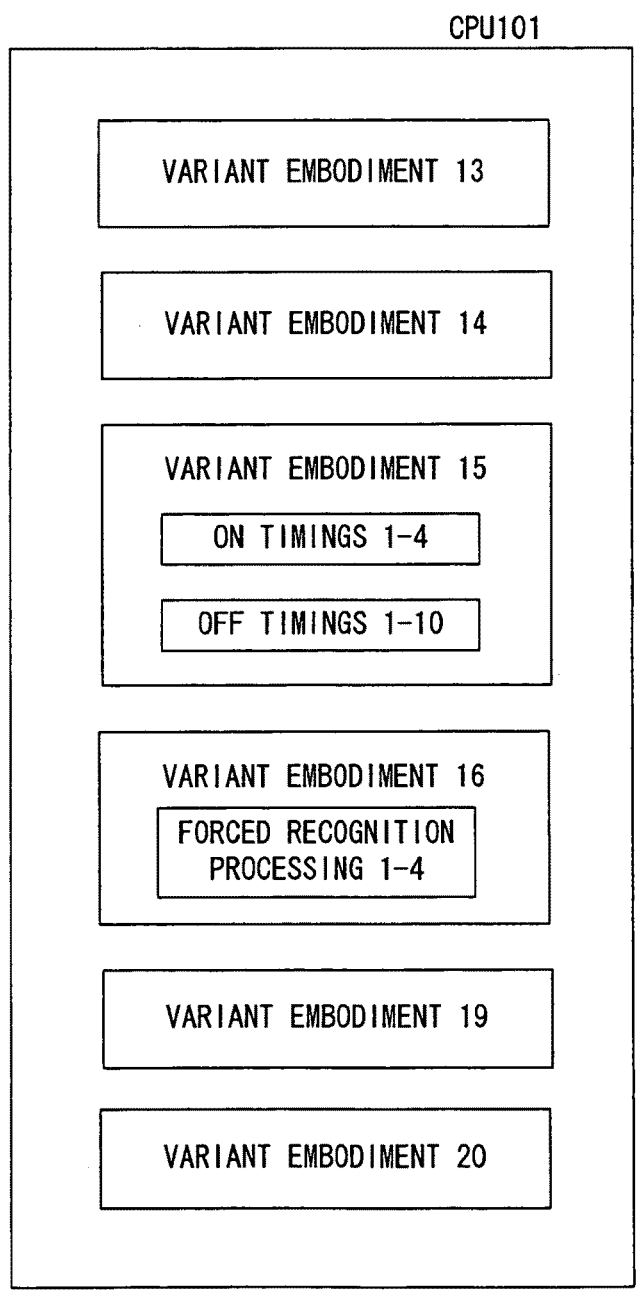
FIG. 15 is a functional block diagram showing variant embodiments #13 through #16, #19, and #20 for processing by the CPU.

FIG. 15 is a functional block diagram showing the above described variant embodiments 13 through 16, 19, and 20 that are processed by the CPU 101.

Variant Embodiment #21

Figure 17:
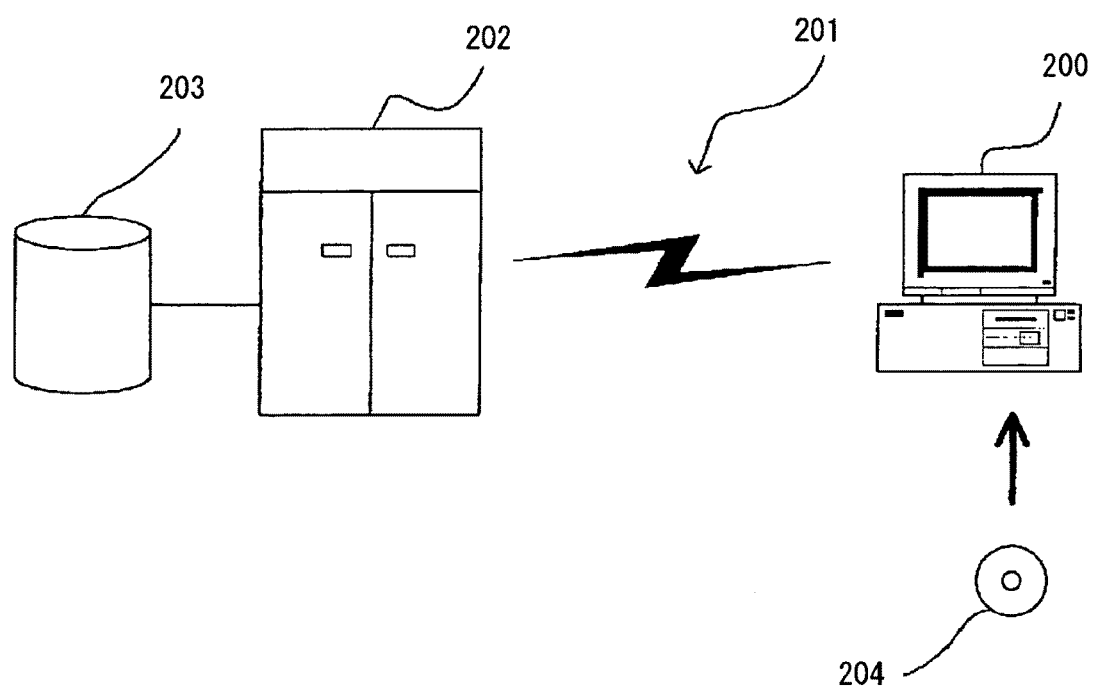
FIG. 17 is a figure showing a situation in which a program is supplied to a personal computer.

It would also be acceptable to implement the replay device of the first through the third embodiments with a computer such as a personal computer or the like. In this case, the program previously described may be supplied via a recording medium such as a CD-ROM or the like, or via a data signal such as the internet or the like. FIG. 17 is a figure showing such a situation. The personal computer 200 receives supply of the program via a CD-ROM 204. Moreover, the personal computer 200 is endowed with the function of connection to a communication circuit 201. A computer 202 is a server computer that supplies the above described program, and the program is stored upon a recording medium thereof such as a hard disk 203 or the like. The communication circuit 201 is a communication circuit such as the internet or the like, or a dedicated communication circuit or the like. The computer 202 reads out the program using the hard disk 203, and transmits the program to the personal computer 200 via the communication circuit 201. In other words, the program is carried as a data signal upon a carrier wave, and is transmitted via the communication circuit 201. In this manner, the program may be supplied as a computer program product that can be read in by a computer in various different formats, such as a recording medium or a signal (a carrier wave) or the like.

It should be understood that this personal computer 200 is connected to the electronic camera 20 and to the display monitor 30. The display monitor 30 is a monitor or a television set that is independent from the personal computer 200. However, it would also be acceptable to arrange to use the monitor of the personal computer 200.

The above explanation has only been provided by way of example; the present invention is not to be considered as being limited by the structure of the embodiments described above. The first through the third embodiments, and the variant embodiments #1 through #21, may be combined in various appropriate ways. Thus, other modes that are considered to fall within the range of the technical concept of the present invention are also included within its scope.

The contents of the disclosure of the following application upon which priority is claimed, and the contents of the following publications, are hereby incorporated herein by reference:

Japanese Patent Application 2006-179193 (filed on Jun. 29, 2006);
Japanese Laid-Open Patent Publication 2002-333652; and
the specification of U.S. Pat. No. 5,982,912.

The invention claimed is:

1. A replay device, comprising a controller that is configured to:
   acquire from an image pickup device a viewer-recognition image in real-time that includes, as a photographic subject, a viewer who views an image output from the replay device;
   perform subject recognition processing based on the photographic subject;
   choose, from a plurality of images, at least one image that includes the viewer, alone or in a group; and
   output the at least one image chosen, from among the plurality of images, for display,
   wherein the controller is configured to acquire the viewer-recognition image from the image pickup device and perform the subject recognition processing until the viewer is recognized by the subject recognition processing, and
   wherein the controller is configured to terminate the subject recognition processing in case that the viewer is not recognized even if the controller performs the subject recognition processing a predetermined number of times.

2. The replay device according to claim 1, wherein the controller is configured to output a predetermined sound that corresponds with at least one image chosen from the plurality of images.

3. The replay device according to claim 1, wherein the image acquired includes a plurality of viewers who view an image output from the replay device; and the controller is configured to choose, from the plurality of images, at least one image that includes only a predetermined viewer from the plurality of viewers.

4. The replay device according to claim 1, wherein the controller is configured to output at least one image chosen from the plurality of images in order of a viewer appearing most often.

5. The replay device according to claim 1, wherein, if the controller does not find images that include the viewer within the plurality of images, the controller is configured to:
output the plurality of images in an order from the most recent image stored.

6. The replay device according to claim 1, further comprising:
an output device that transmits the at least one image chosen by the controller to a display device.

7. The replay device according to claim 1, wherein the controller acquires the image of the viewer from an image pickup device that captures the image of the viewer.

8. The replay device according to claim 1, further comprising:
a display device that displays the at least one image output by the controller.

9. The replay device according to claim 1, wherein the plurality of images are stored as albums, and the controller is configured to:
choose images and albums associated with the viewer recognized during the subject recognition processing; and
output the albums or images associated with the viewer recognized during the subject recognition processing on a display device.

10. The replay device according to claim 9, wherein the albums or images associated with the viewer recognized are displayed as thumbnail images.

11. The replay device according to claim 1, wherein the image acquired during the subject recognition processing is output in an inverted orientation.

12. The replay device according to claim 7, wherein the controller is configured to delete the image of the viewer from the image pickup device after the controller has acquired the image.

13. The replay device according to claim 1, wherein the controller is configured to:
output a signal in order to notify the viewer that the subject recognition processing is being performed.

14. The replay device according to claim 1, wherein the controller is configured to:
output a thumbnail image corresponding to the at least one image chosen prior to outputting the at least one image chosen so that the viewer can designate the at least one image chosen to be displayed by using the thumbnail image; and
output the at least one image chosen for display that has been designated by a user to be displayed.

15. A replay system, comprising:
a display device;
an image pickup device that captures a viewer-recognition image that includes, as a photographic subject, a viewer who is in front of the display device and views an image displayed on the display device; and
a replay device comprising a controller that is configured to:
acquire the image in real-time from the image pickup device;
perform subject recognition processing based on the photographic subject;
choose, from a plurality of images, at least one image that includes the viewer, alone or in a group; and
output at least one image chosen, from among the plurality of images to be displayed on the display device,
wherein the controller is configured to control the image pickup device to capture the viewer-recognition image, acquire the viewer-recognition image from the image pickup device and perform the subject recognition processing, until the viewer is recognized by the subject recognition processing, and
wherein the controller is configured to terminate the subject recognition processing in case that the viewer is not recognized even if the controller performs the subject recognition processing a predetermined number of times.

16. The replay system according to claim 15, wherein the display device is a television having a demodulation unit that receives a television broadcast and obtains a replay signal.

17. The replay system according to claim 15, wherein the controller is configured to acquire the image when the replay device is actuated to be turned on.

18. The replay system according to claim 15, wherein, if a viewer is not recognized by the subject recognition processing, the image pickup device repeatedly captures the image of the viewer a predetermined number of times.

19. The replay device according to claim 15, wherein the controller is configured to control the image pickup device to shift a photographic zoom lens of the image pickup device towards a wide angle side in case that the viewer is not recognized.

20. A replay device, comprising:
means for acquiring from an image pickup device a viewer-recognition image in real-time that includes, as a photographic subject, a viewer who views an image output from the replay device;
means for performing subject recognition processing based on the photographic subject;
means for choosing, from a plurality of images, at least one image that includes the viewer, alone or in a group; and
means for outputting the at least one image chosen, from among the plurality of images, for display,
wherein the viewer-recognition image is acquired from the image pickup device and the subject recognition processing is performed until the viewer is recognized by the subject recognition processing, and
wherein the subject recognition processing is terminated in case that the viewer is not recognized even if the subject recognition processing is performed a predetermined number of times.

21. A display device, comprising a controller that is configured to:
acquire from an image pickup device a person-recognition image in real-time that includes, as a photographic subject, a person who is in front of the display device;
perform subject recognition processing based on the photographic subject;

choose, from a plurality of images, at least one image that includes the person, alone or in a group; and output the at least one image chosen, from among the plurality of images, for display, wherein the controller is configured to acquire the person-recognition image from the image pickup device and perform the subject recognition processing until the person is recognized by the subject recognition processing, and wherein the controller is configured to terminate the subject recognition processing in case that the person is not recognized even if the controller performs the subject recognition processing a predetermined number of times.

22. A replay device, comprising a controller that is configured to:

acquire from an image pickup device a viewer-recognition image in real-time that includes, as a photographic subject, a viewer who views an image output from the replay device;

perform subject recognition processing based on the photographic subject;

choose, from a plurality of images, at least one image that includes the viewer, alone or in a group; and output the at least one image chosen, from among the plurality of images, for display, wherein the controller is configured to acquire the viewer-recognition image from the image pickup device and perform the subject recognition processing until the viewer is recognized by the subject recognition processing, and wherein the controller is configured to control the image pickup device to shift a photographic zoom lens of the image pickup device towards a wide angle side in case that the viewer is not recognized.

* * * * *